United States Patent Office 3,201,392
Patented Aug. 17, 1965

3,201,392
PREGNANE-17α-OL-16α - ACETALDEHYDE 16b,17-CYCLIC ENOL ETHERS AND PROCESS FOR THE PRODUCTION THEREOF
John E. Pike, Kalamazoo, Mich., assignor to The Upjohn Company, Kalamazoo, Mich., a corporation of Delaware
No Drawing. Filed Apr. 3, 1963, Ser. No. 270,171
32 Claims. (Cl. 260—239.55)

This invention relates to novel steroids and to processes for their preparation, and is more particularly concerned with pregnane-17α-ol-16α-acetaldehyde 16b,17-cyclic enol ethers and with processes for their preparation, and with closely related intermediates for, and degradation products of, these compounds.

This application is a continuation-in-part of my copending application Serial No. 170,262, filed January 31, 1962, now abandoned.

The novel compounds of the invention are selected from the class consisting of compounds having the formulae:

(I)

(II)

(III)

and the corresponding dihydro compounds having the formulae:

(IV)

(V)

(VI)

and the $\Delta^{6(7)}$-derivatives of the compounds of Formulae I and IV. In the above formulae, R is selected from the class consisting of hydrogen, fluorine, and methyl, Z is selected from the class consisting of hydrogen and methyl, R' is selected from the class consisting of hydrogen and lower-alkyl, R" is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as hereinbefore defined, and —$C_1$—$C_2$— is a divalent radical selected from the class consisting of —$CH_2$—$CH_2$— and —CH=CH—.

The term "lower-alkyl" means an alkyl radical containing from 1 to 8 carbon atoms, inclusive, such as methyl, ethyl, propyl, butyl, amyl, hexyl, heptyl, octyl and isomeric forms thereof. The term "hydrocarbon carboxylic acid containing from 1 to 12 carbon atoms, inclusive" means saturated and unsaturated aliphatic and aromatic carboxylic acids having the required number of carbon atoms, such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenlyvaleric, cinnamic, phenylpropiolic, phenylpropionic, p-butoxyphenylpropionic, succinic, glutaric, dimethylglutaric, maleic, cyclopentylpropionic acids, and the like.

The novel compounds of the invention, having the Formulae I, II, III, IV, V and VI above possess activity as anti-inflammatory, progestational, central nervous system regulating, glucocorticoid, anti-hormonal, lipid-mobilizing, hypotensive, cardiotonic, cholesterol-lowering and anti-fertility agents. Illustratively, the compounds of the invention, particularly those of the Formulae I and IV, are anti-inflammatory agents which are relatively free from the side-effects such as body-weight loss, adrenal inhibition, induction of thymolysis, ulcerogenicity and the like, commonly associated with anti-inflammatory corticoids.

The novel compounds of the invention, having the Formulae I, II, III, IV, V, and VI above can be prepared and administered to mammals, including valuable domestic animals, and to birds, in a wide variety of oral or parenteral dosage forms, singly, or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solution, emulsions, suspensions, syrups, or elixirs.

In addition to their usefulness as physilogically and pharmacologically active agents the compounds of the Formulae I, II, III, IV, V, and VI are useful as intermediates in the preparation of other useful steroids as will be described hereinafter.

The novel compounds of the invention having the Formulae I, II and III can be prepared according to the following series of reactions.

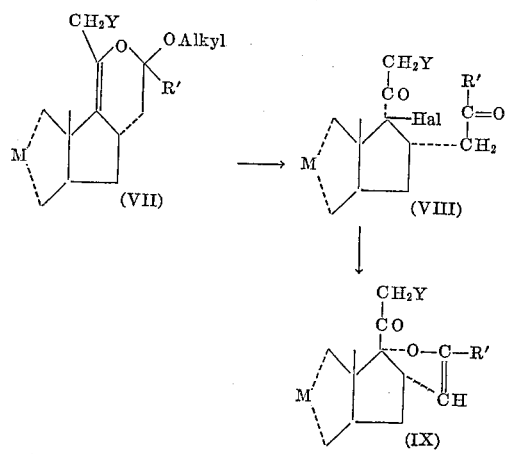

In the above formulae R' and Y have the significance hereinbefore defined, Hal represents chlorine, bromine, or iodine and M represents the residue of a steroid molecule the A, B and C rings of which correspond to those in the corresponding rings of compounds I, II or III.

The starting material VII employed in the above process is a 2'-substituted-6'β-alkoxy-5',6-dihydroandrostano-[17,16α-c]-pyran which has in the A, B and C rings (represented by the residue M) the appropriate substituents corresponding to those in the A, B, and C rings of compounds (I), (II) or (III). The following basic system of numbering is used throughout the specification and claims when naming a compound having the Formula VII:

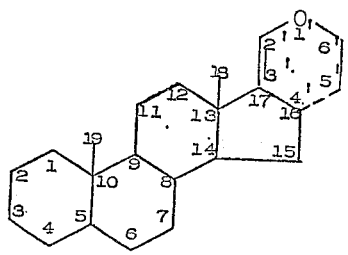

In the process shown above the starting androstano-[17,16α-c]-pyran (VII) is subjected to what can best be termed oxidative halogenation which results in cleavage of the dihydropyran ring, addition of halogen at the 17-position and oxidation of the side chain at position 16 to produce the corresponding compound (VIII). The oxidative halogenation is accomplished by treating the compound (VII) with an N-haloamide or N-haloimide wherein the halogen is chlorine, bromine, or iodine, in the presence of an acid such as acetic, formic, perchloric, p-toluenesulfonic acids and the like, preferably acetic acid buffered with sodium acetate. Examples of N-haloamides and N-haloimides which can be used in the process are N-chloroacetamide, N-bromoacetamide, N-chlorosuccinimide, N-bromosuccinimide, N-iodosuccinimide, N-bromophthalimide, 3-bromo-5,5-dimethylhydantoin, and 1,3-dibromo-5,5-dimethylhydantoin.

The oxidative halogenation is carried out advantageously by bringing the reactants together at room temperature (ca. 25° C.) or below this temperature and preferably at about 0° C., in the presence of an inert organic solvent, i.e., an organic solvent which does not itself take part in the reaction. Representative inert organic solvents are acetone, methyl ethyl ketone, dioxane, tetrahydrofuran, t-butyl alcohol, methylene chloride, and the like. Advantageously, the N-haloamide or N-haloimide is employed in slight excess of stoichiometric quantity with respect to steroid starting material.

When the reaction is complete (generally a period of one hour or less depending on the particular reactants), the excess oxidizing agent is destroyed by the addition of a reducing agent such as sodium sulphite, sodium bisulfite, and the like and the desired reaction product (VIII) is isolated from the reaction mixture by conventional procedures. For example, the reaction mixture is poured into water and the desired product (VIII) is isolated by solvent extraction. The solvent extracts are evaporated to dryness and the residue purified by conventional procedures, for example, by recrystallization.

The 17β-halo compound (VIII) so obtained is then subjected to cyclization by dehydrohalogenation to produce the desired compound (IX). The dehydrohalogenation is carried out advantageously by treating the compound (VIII) with a dehydrohalogenating agent at elevated temperatures in the presence of an inert organic solvent. Dehydrohalogenation agents which can be employed in this process include anhydrous lithium salts such as lithium chloride, lithium bromide, lithium carbonate and the like, alkaline earth metal carbonates such as calcium carbonate, barium carbonate, strontium carbonate, and the like, or tertiary organic amines such as pyridine, collidine, N-methylpiperidine, and the like. Preferably the dehydrohalogenating agent is a mixture of anhydrous lithium bromide and lithium carbonate.

The inert organic solvents which are employed in the dehydrohalogenation process are those organic solvents which are inert under the conditions of the reaction. Illustrative of such solvents are dimethylsulfoxide or N-alkyl substituted aliphatic amides, such as dimethylformamide, dimethylacetamide, N-methyl-2-pyrrolidone and the like.

The dehydrohalogenation is preferably carried out at temperatures from room temperature up to the boiling point of the solvent employed. The reaction generally takes from 1 to 24 hours for completion. The desired product (IX) is isolated from the reaction mixture by conventional procedures, for example, by filtration followed by evaporation of the filtrate. Purification of the residue is effected by conventional procedures such as by recrystallization, fractional crystallization, chromatography or any combination of these steps.

When the starting material (VII) used in the above series of reactions (VII→VIII→IX) contains a free hydroxy group or groups, illustratively, a 3-hydroxy or a 21-hydroxy group (Y=OH), said group or groups is preferably protected, for example, by acylation, before carrying out the aforesaid reactions. The protective acyl group can, if desired, be removed by hydrolysis after the series of reactions has been completed. The acylation and deacylation are carried out by conventional procedures. For example, the acylation is carried out by reacting the hydroxy compound with the appropriate acid halide or acid anhydride in the presence of a tertiary base such as pyridine. The deacylation is carried out, for example, by hydrolysis using mild basic conditions, mineral acid or p-toluenesulfonic acid under aqueous or aqueous alcoholic conditions.

The compounds (VII) which are employed as starting materials in the above reactions can be prepared as described in my co-pending application Serial No. 170,262, filed January 31, 1962. Briefly the preparation of the compounds of Formula VII is accomplished by reacting the correspondingly substituted $\Delta^{16}$-20-ketopregnane having the formula:

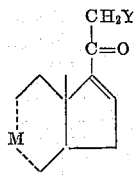

wherein M and Y have the significance hereinbefore defined, with the appropriately substituted vinyl alkyl ether

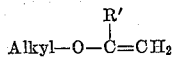

wherein R' has the significance hereinbefore defined, under conditions normally employed in Diels-Alder reactions. Such conditions are described by, for example, Longley and Emerson, J. Am. Chem. Soc. 72, 3079, 1950; Parham and Holmquist, ibid., 73, 913, 1951; Smith et al., ibid., 73, 5267, 1961; Emerson et al., ibid., 75, 1312, 1953; Korte et al., Tetrahedron 6, 201, 1959; Ansell and Gadsby, J. Chem. Soc. 3388, 1958; Brannock, J. Org. Chem. 25, 258, 1960.

The condensation is carried out by bringing the $\Delta^{16}$-20-ketopregnane and the alkoxy vinyl ether together, advantageously in the presence of a catalyst at a temperature within the range of about 25° C. to about 300° C., preferably within the range of about 150° C. to about 250° C. Any of the catalysts normally employed in the Diels-Alder type condensation (see supra) can be used in the condensation. Such catalysts include hydroquinone, aluminum chloride, boron trifluoride, stannic chloride, ferric chloride, titanium tetrachloride, and the like. The preferred catalyst is hydroquinone.

The alkoxy vinyl ether is present in the reaction mixture advantageously in excess of equimolar proportions with respect to the starting $\Delta^{16}$-20-ketopregnane and preferably in substantial excess of this amount. Advantageously the excess of alkoxy vinyl ether serves as a solvent for the reaction mixture and no other solvent need be used. However, an additional solvent can be present, if desired. Suitable solvents for this purpose are inert organic solvents, such as benzene, xylene, toluene, nitrobenzene, dioxane, ether, ethanol, ethylene dichloride, acetic acid, cyclohexane, and the like.

The above reaction gives rise to a mixture of the 16α, 6'α-, 16β,6'α-, 16α,6'β-, and 16β,6'β-epimers of the androstano-[17,16-c]-pyran. This mixture can be separated into its components using conventional procedures such as chromatography, countercurrent distribution, and the like, or any combination of these steps.

Examples of 2'-substituted-6'β-alkoxy-5',6'-dihydroandrostano-[17,16α-c]-pyrans of Formula VII which can be employed as starting materials in the process of the invention are:

$\Delta^5$-3β-acetoxy-2'-methyl-,
$\Delta^4$-3-keto-2'-methyl-,
$\Delta^4$-3-keto-2',6α-dimethyl-,
$\Delta^{1,4,9(11)}$-3-keto-2',6α-dimethyl-,
$\Delta^5$-3β-acetoxy-2'-acetoxymethyl-,
$\Delta^4$-3,11-diketo-2'-methyl-,
$\Delta^4$-3-keto-11α-hydroxy-2'-methyl-,
$\Delta^4$-3-keto-11β-hydroxy-2'-methyl-,
$\Delta^4$-3-keto-11β-hydroxy-2'-acetoxymethyl-,
$\Delta^4$-3,11-diketo-2'-acetoxymethyl-,
$\Delta^4$-3-keto-2'-acetoxymethyl-,
$\Delta^4$-3,11-diketo-6α-methyl-2'-acetoxymethyl-,
$\Delta^4$-3-keto-11β-hydroxy-6α-methyl-2'-acetoxymethyl-,
$\Delta^{4,9(11)}$-3-keto-6α-methyl-2'-acetoxymethyl-,
$\Delta^{1,4}$-3-keto-6α,2'-dimethyl-,
$\Delta^{1,4}$-3-keto-11β-hydroxy-2'-methyl-,
$\Delta^{1,4}$-3,11-diketo-6α-methyl-2'-acetoxymethyl-,
$\Delta^{1,4}$-3-keto-11β-hydroxy-6α-methyl-2'-acetoxymethyl-,
$\Delta^{1,4,9(11)}$-3-keto-6α-methyl-2'-acetoxymethyl-,
$\Delta^{1,4}$-3,11-diketo-2'-methyl-,
$\Delta^{1,4}$-3-keto-11α-hydroxy-2'-methyl-,
$\Delta^{1,4}$-3-keto-11β-hydroxy-2'-acetoxymethyl-,
$\Delta^{1,4}$-3,11-diketo-2'-acetoxymethyl-,
$\Delta^{1,4}$-3-keto-2'-acetoxymethyl-,
$\Delta^5$-3β-acetoxy-2',6-dimethyl-,
3β-acetoxy-2'-methyl-,
3α-acetoxy-11-keto-2'-methyl-,
3α-acetoxy-11β-hydroxy-2'-methyl-,
3α-acetoxy-2'-methyl-,
$\Delta^4$-9α-fluoro-3-keto-11β-hydroxy-2'-acetoxymethyl-,
$\Delta^4$-9α-fluoro-3,11-diketo-2'-acetoxymethyl-,
$\Delta^{1,4}$-9α-fluoro-3,11-diketo-2'-acetoxymethyl-,
$\Delta^{1,4}$-9α-fluoro-3-keto-11β-hydroxy-2'-acetoxymethyl-,
$\Delta^4$-9α-fluoro-3,11-diketo-2'-methyl-, and
$\Delta^{1,4}$-9α-fluoro-3,11-diketo-2'-methyl-6'β-methoxy-5',6'-dihydroandrostano-[17,16α-c]-pyran;
3β-acetoxy-11-keto-2'-acetoxymethyl-,
3β-acetoxy-11β-hydroxy-2'-acetoxymethyl-, and
3β-acetoxy-2'-methyl-6'β-methoxy-5',6'-dihydro-5α-androstano-[17,16α-c]-pyran.

The compounds of the invention having the Formula I wherein —$C_1$—$C_2$— represents a double bond can be prepared either (a) by employing the corresponding $\Delta^{1,4}$-5',6'-dihydroandrostano-[17,16α-c]-pyran as starting material in the reactions described above or (b) by subjecting the corresponding compound in which —$C_1$—$C_2$— represents a saturated bond to 1-dehydrogenation. Said 1-dehydrogenation can be effected by methods known in the art, for example, by heating with a dehydrogenation agent such as selenium dioxide, dichlorodicyanoquinone, and the like in the presence of acetic acid and an inert organic solvent such as dioxane, tetrahydrofuran, t-butanol, t-amyl alcohol, and the like.

Similarly, the compounds of the invention having the Formula I having a double bond at the 6(7)-position can be obtained from the corresponding compounds lacking the double bond at this position by heating the latter compounds with chloranil or like dehydrogenating agents in the presence of acetic acid and an inert organic solvent such as dioxane, tetrahydrofuran, t-butanol, t-amyl alcohol, and the like. Where the starting material contains a saturated bond at the 1,2-position said bond will also be replaced by a double bond during the dehydrogenation with chloranil and like dehydrogenation agents.

The compounds (I), (II), and (III) (embraced by the Formula IX), prepared as described above, can be converted to the corresponding dihydro compounds IV, V and VI by a variety of methods. For example the compound (IX) can be reacted with a lower-alkyl mercaptan in the presence of a small amount of a strong acid such as p-toluenesulfonic acid, sulfuric acid, hydrochloric acid, hydrobromic acid, perchloric acid and the like. Advantageously the reaction is carried out in the presence of an inert organic solvent such as dioxane, tetrahydrofuran, ethanol, isopropyl alcohol, and the like. The reaction is preferably conducted at room temperature (ca. 25° C.) or above. The starting compound (IX) is thus converted to the corresponding thioether having the formula:

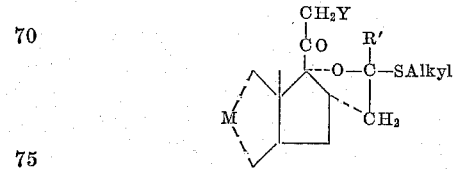

wherein "alkyl" represents lower-alkyl as hereinbefore defined and M, Y and R' are as hereinbefore defined.

The above thioether so obtained is isolated from the reaction mixture by conventional procedures, for example by evaporation of the solvent followed by purification of the residue, for example, by recrystallization, partition chromatography, counter-current distribution, and the like.

The thioether so obtained is then subjected to catalytic desulfurization, for example by treatment with a Raney nickel catalyst in the presence of a neutral, non-halogenated solvent, preferably methanol, ethanol, propanol, and the like. The reaction is preferably conducted at reflux temperature. The desired product can be isolated from the reaction mixture in a convenient manner by removing the catalyst and evaporating the filtrate to dryness. Further purification of the product can be accomplished by recrystallization, chromatography and like procedures. There is thus obtained the dihydro derivative of the starting material (IX) i.e., the dihydro compounds IV, V and VI depending upon the A, B and C ring substituents present in the starting material (IX).

Alternatively the dihydro compounds IV, V and VI can be prepared by the following procedure. The 17-bromo-16-acetaldehydo compound (VIII) is subjected to oxidation using oxidizing agents such as sodium dichromate, potassium dichromate, chromic acid, and the like which are conventional in the art for the oxidation of aldehydes to carboxylic acids. There is thus obtained the corresponding 17-bromo-16-acetic acid derivative which is then esterified, for example with diazomethane or by reaction with the appropriate alcohol to obtain the corresponding ester. The latter ester so obtained is then subjected to dehalogenation, for example under the conditions described above for the dehydrohalogenation of the 17-bromo-16-aldehyde, to give the lactone of the corresponding 17-hydroxy-16-acetic acid compound. The above series of reactions is shown schematically as follows:

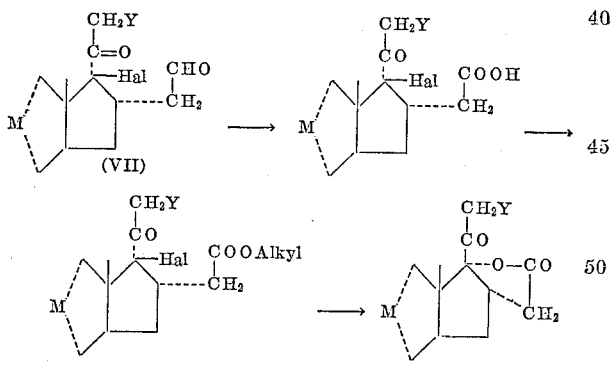

In the above formulae M, Y, Hal, and Alkyl have the significance above defined.

The lactone so obtained is then subjected to reduction with boron trifluoride and sodium borohydride under the conditions described by Pettit and Piatak, J. Org. Chem. 27, 2127 (1962) for the reducttion of ring A steroid lactones. There is thus obtained the desired dihydro compounds IV, V and VI depending on the substituents in the A, B, and C ring of the starting compound (VII).

Before the above reduction is carried out, it is necessary to protect the 20-keto group, and the 3-keto group if such is present, in the lactone using conventional ketone protecting groups. Advantageously, this can be done by converting the lactone to the corresponding 20-semicarbazone (or 3,20-bissemicarbazone if the 3-keto group is present). The semicarbazone can be hydrolyzed to the corresponding ketone after the reduction is completed. The hydrolysis can be effected by conventional procedures, advantageously by treatment with pyruvic acid in a solvent such as acetone, dimethylformamide and like N,N-dialkylformamides.

Alternatively, the double bond in the pyran ring of (I), (II) and (III) can be selectively reduced by catalytic hydrogenation, e.g. with palladium-on-charcoal and hydrogen.

The compounds I, II, and III, as previously mentioned, are useful as intermediates in the preparation of other useful steroids. The various compounds which can be derived from the compounds I, II, and III (shown collectively as Formula IX) and the processes by which they are obtained, are illustrated in the following reaction scheme:

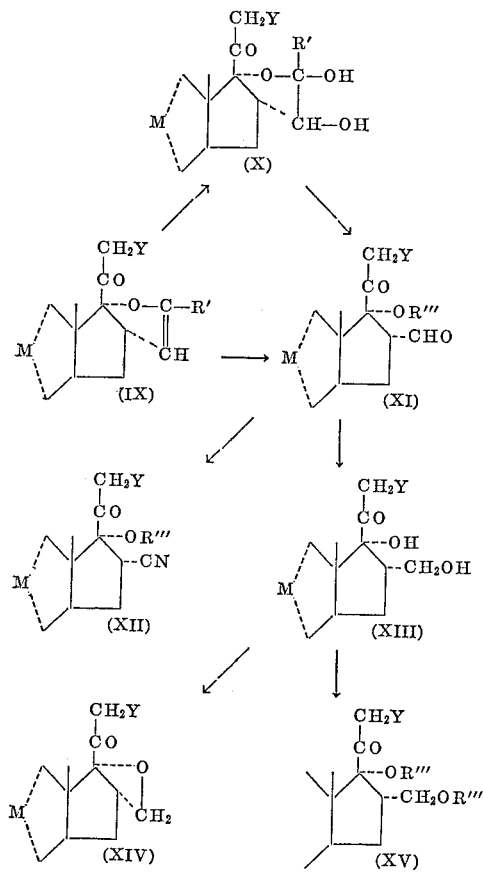

In the above formulae M, Y, and R' have the significance defined, R''' and R'''' are each selected from the class consisting of hydrogen and the acyl radical of a hydrocarbon carboxylic acid as hereinbefore defined, and R''' and R'''' taken together represent the radical

wherein P and Q are selected from the class consisting of hydrogen, lower-alkyl, lower-aralkyl, and lower-aryl, and P and Q taken together with the attached carbon atom can also represent cycloalkyl from 5 to 7 carbon atoms, inclusive, such as cyclopentyl, cyclohexyl, and cycloheptyl.

The term "lower-aralkyl" means an aralkyl group containing from 7 to 13 carbon atoms, inclusive, such as benzyl, phenethyl, phenylpropyl, benzhydryl, and the like. The term "lower-aryl" means an aryl radical containing from 6 to 12 carbon atoms, inclusive, such as phenyl, tolyl, xylyl, diphenylyl and the like.

The conversion of the compound (IX) to the glycol (X) is effected by oxidation procedures conventional in the art for the conversion of olefins to the corresponding glycols. Advantageously, the oxidation is carried out using an oxidizing agent such as osmium tetroxide, potassium permanganate, sodium chlorate, and the like, in the presence of an inert organic solvent such as tetrahydrofuran, dioxane, methylene chloride and the like. Using osmium tetroxide as oxidizing agent, the oxidation can be carried out conveniently at or near room temperature. The desired glycol (X) can be isolated from the reaction mixture by conventional procedures. For example, when osmium tetroxide is employed as oxidizing agent, the excess osmium is precipitated by use of hydrogen sulfide and the compound (X) is isolated by evaporation of the filtrate after removal of the precipitate by filtration. The compound (X) so obtained can be purified by conventional procedures such as recrystallization, chromatography and the like.

The glycol (X) so obtained can be converted to the corresponding 17α-hydroxy-16-aldehydo compound (XI), using oxidizing agents such as lead tetraacetate, sodium periodate, and the like, known in the art for the cleavage of glycols. The reaction is carried out advantageously by bringing the reactants together in the presence of an inert organic solvent such as benzene, toluene, xylene and the like at room temperature (approximately 25° C.) or slightly above. The desired product (XI) can be isolated from the reaction mixture by conventional procedures, for example, by washing the organic solution with water to remove excess oxidizing agent followed by evaporation of the organic solution. The residue so obtained is purified by conventional procedures such as by recrystallization, chromatography and the like.

The compound (IX) can also be converted directly to the compound (XI) without isolation of the intermediate glycol (X) by combining the two oxidation processes, i.e. carrying out the oxidation to the glycol as described above using, for example, osmium tetroxide, and then adding to the reaction mixture (without isolation of the glycol) the second oxidant, for example, sodium periodate, and the like, and carrying out this phase of the reaction as described above.

The 16-aldehyde (XI) so obtained can be converted to the corresponding 16-cyano compound (XII) using, for example, the procedure described by Pomeroy and Craig, J. Am. Chem. Soc., 81, 6340, 1959, namely, by reacting the 16-aldehyde (XI) with O,N-bis-(trifluoroacetyl)hydroxylamine in the presence of a tertiary base such as pyridine, triethylamine, tripropylamine, N-methylpiperidine and the like. The 16-cyano compound (XII) so obtained can be purified, if desired, by conventional procedures, for example, by crystallization, chromatography, and the like.

The 16-cyano compound (XII; R'''=H), so obtained can be converted to the corresponding acylate (R'''=acyl as hereinbefore defined) using conventional procedures for the acylation of 17-hydroxy groups. Advantageously, the free 17-hydroxy compound is reacted with the appropriate acid anhydride or acid halide in the presence of an inert organic solvent and a strong acid such as p-toluenesulfonic, 2,4-dinitrobenzenesulfonic acid and the like.

The 16-aldehyde (XI) can also be converted, by reduction, to the corresponding 16-hydroxymethylene compound (XIII) using procedures well-known in the art for the reduction of an aldehyde to the corresponding primary alcohol. For example, the 16-aldehyde (XIII) can be reduced using a reducing agent such as sodium borohydride, potassium borohydride, and the like in the presence of an inert solvent such as ether, tetrahydrofuran, dioxane and the like. The reduction is advantageously carried out at reduced temperature and preferably at about 0° C. The desired 16-hydroxymethylene compound (XIII) is isolated from the reaction mixture by conventional procedures, for example, by decomposing any excess reducing agent followed by evaporation of the reaction solution and purification of the residue by recrystallization, chromatography or like procedures.

The 16-hydroxymethylene compound (XIII) so obtained can be converted to the corresponding acylates or acetonides (XV) using procedures conventional in the art for the preparation of such compounds. For example, the compound (XIII) can be acylated by reaction with the appropriate carboxylic acid anhydride or acid halide in the presence of a tertiary base such as pyridine, triethylamine and the like, or in the presence of an inert organic solvent such as carbon tetrachloride, benzene toluene and the like and a strong acid such as p-toluenesulfonic, 2,4-dinitrobenzenesulfonic acid and the like. Using the former procedure, i.e. basic conditions, only the 16-hydroxymethyl group is acylated. Using the acid conditions both the 16-hydroxymethylene and the 17-hydroxy groups are thereby acylated to obtain XV (R'''=R''''=acyl)

To prepare the acetonides of Formula XV (R''' and R''''=

wherein P and Q are as hereinbefore defined) the corresponding compound (XIII) is reacted with the appropriate aldehyde or ketone having the formula

wherein P and Q are as hereinbefore defined, in the presence of an acid catalyst such as perchloric acid, p-toluenesulfonic acid, hydrochloric acid, and the like. Where the aldehyde or ketone is a liquid, it is convenient to employ an excess of same to serve as solvent for the reaction. Where the aldehyde or ketone is a solid, it is desirable to employ an inert organic solvent such as tetrahydrofuran, dioxane, ether and the like to facilitate the carrying out of the condensation. The desired acetonide (XV) can be isolated from the reaction mixture by conventional procedures, for example, by neutralizing the reaction mixture, evaporating the latter to dryness, and purifying the residue, if necessary, by conventional procedures such as recrystallization, chromatography and the like.

The compound (XIII) can be converted to the 16,17-epoxy-methylene compound (XIV) using the following procedure. The compound (XIII) is first subjected to sulfonacylation by reaction with an alkylsulfonyl halide such as methanesulfonyl chloride, methanesulfonyl bromide, ethanesulfonyl chloride, and the like or an arylsulfonyl halide such as p-toluenesulfonyl chloride, benzenesulfonyl chloride, and the like in the presence of a tertiary organic base such as pyridine, triethylamine, and the like. There is thus obtained the corresponding 16-sulfonacyloxymethyl compound which is then subjected to cyclization, for example, by reaction with an alkali metal alkoxide such as potassium ethoxide, potassium t-butoxide, sodium t-butoxide, and the like in the presence of an alkanol, advantageously the same alkanol as that from which the alkali metal alkoxide is derived. The cyclization is advantageously carried out at or about normal temperatures i.e. 20° C. and the desired compound (XIV) is isolated from the reaction mixture by conventional procedures, for example, by acidification and aqueous dilution of the reaction mixture followed by solvent extraction. Purification of the product (XIV) is achieved by standard procedures such as recrystallization, chromatography, and the like.

Those compounds of the Formulae X, XI, XII, XIII and XIV wherein there is present a 1,2-double bond and/or a 6,7-double bond can be obtained by employing the appropriately substituted starting materials in the earlier stages of the various syntheses or can be obtained directly from the corresponding compounds which lack such double bonds by reaction of the latter compounds with the appropriate dehydrogenation agents as hereinbefore described for the introduction of 1,2-double bonds and/or 6,7-double bonds in the compounds having the Formula I.

In the various conversions of the compound (IX) to compounds (X), (XI), (XII), (XIII) and (XIV), which are shown and described above, the radical Y can, as previously stated, represent hydrogen, hydroxy, or acyloxy. It is to be understood that where Y represents free hydroxy in the starting materials used in the various processes discussed, said group is preferably converted to acyloxy by standard procedures before the reaction is carried out. The free hydroxy group can usually be regenerated, when the reaction is complete, by acid hydrolysis using procedures well known in the art to obtain in the desired compound wherein Y=OH.

The compounds (X), (XI,) (XII), (XIII), (XIV) and (XV) (it being understood that M represents the residue of a steroid molecule having A, B and C rings corresponding to those of compounds I, II and III) possess activity as anti-inflammatory, progestational, central nervous system regulating, gluco-corticoid, anti-hormonal, lipid-mobilizing, hypotensive, cardiotonic, cholesterol-lowering, and anti-fertility activity. Illustratively, the compounds of the Formulae X, XI, XII, XIII, XIV and XV are anti-inflammatory agents which are relatively free from the side-effects such as body-weight loss, adrenal inhibition, induction of thymolysis, ulcerogenicity and the like, commonly associated with anti-inflammatory corticoids.

The compounds (X), (XI), (XII), (XIII), (XIV) and (XV) can be prepared and administered to mammals, including valuable domestic animals, and to birds using the procedures and formulations set forth above for the compounds (I), (II), (III), (IV), (V) and (VI).

The compounds of the invention having the Formulae I and IV wherein the A-ring contains the $\Delta^4$-3-keto grouping are useful as intermediates in the preparation of the corresponding [3,2-c]-pyrazoles and the N-substituted derivatives thereof, for example, the [3,2-c]-2'-phenyl-pyrazole and [3,2-c]-2'-p-fluorophenylpyrazole derivatives of the above compounds. The [3,2-c]-pyrazole compounds are useful as highly active anti-inflammatory agents. Illustratively, the compounds 6α-methyl-9α-fluoro- and 6α,9α-difluoro - 11β,17α,21-trihydroxy-3,20-diketo - 2'-p-fluorophenyl - 4-pregneno-[3,2-c]-pyrazole-16α-acetaldehyde cyclic enol ether 21-acetate, are highly active anti-flammatory agents. The [3,2-c]-pyrazole compounds can be prepared by reacting the starting $\Delta^4$-3-ketosteroids with ethyl formate and sodium hydride in solution in an inert organic solvent such as benzene, toluene and the like, and reacting the resulting 2-hydroxymethylene compound with hydrazine or the appropriate monosubstituted hydrazine to obtain the desired [3,2-c]-pyrazole. The reaction conditions employed in the conversion of the $\Delta^4$-3-ketosteroid to the corresponding [3,2-c]-pyrazole are advantageously those described in U.S. Patent 3,072,642.

The following preparations and examples illustrate the best method contemplated by the inventor for carrying out his invention, but are not to be construed as limiting the scope thereof:

PREPARATION 1

*9α-fluoro-11β-hydroxy-2',6α-dimethyl-$\Delta^{1,4}$-3-keto-6'β-methoxy-5',6'-dihydroandrostano-[16,17α-c]-pyran*

A. 6α-METHYL-1,4,9(11),16-PREGNATETRAENE-3,20-DIONE

A solution of 4.0 g. of 6α-methyl-17α-hydroxy-1,4,9(11)-pregnatriene-3,20-dione (U.S. Patent 2,867,632) in 7.5 ml. of pyridine was cooled to approximately 10° C. To this solution was added with stirring and cooling a solution of 2.0 g. of N-bromoacetamide in 7.5 ml. of pyridine previously cooled to approximately 10° C. The resulting mixture was allowed to stand for a short period at room temperature (approximately 25° C.) before being cooled to about 10° C. and added dropwise with stirring to a solution of 2.2 g. of sulfur dioxide in 10 ml. of pyridine. The temperature during the addition was maintained at approximately 15° C. When the addition was complete, the mixture so obtained was stirred for a short period and allowed to warm to about 20° C. before being added dropwise with stirring to a mixture of 25 ml. of concentrated hydrochloric acid and 400 ml. of ice water. The solid which separated was isolated by filtration, washed with water until the washings were no longer acidic, and recrystallized from methanol. There was thus obtained 1.05 g. of 6α-methyl-1,4,9(11),16-pregnatetraene-3,20-dione in the form of a crystalline solid having a melting point of 205 to 207° C. Further recrystallization from methanol raised the melting point to 210 to 212.5° C.; $[\alpha]_D$ +89° (acetone)

$$\lambda_{max}^{EtOH} = 238\ m\mu,\ \epsilon = 24,285$$

*Analysis.*—Calcd. for $C_{22}H_{26}O_2$: C, 81.95; H, 8.13. Found: C, 81.27; H, 7.93.

B. 6α-METHYL-9β,11β-OXIDOPREGNA-1,4,16-TRIENE-3,20-DIONE

To a stirred solution of 8.12 g. of 6α-methylpregna-1,4,9(11),16-tetraene-3,20-dione in 169 ml. of methylene chloride and 338 ml. of t-butyl alcohol was added a solution of 4.46 g. of N-bromoacetamide in 81 ml. of t-butyl alcohol followed by a solution of 23 ml. of 70% perchloric acid in 122 ml. of water. The resulting mixture was stirred for approximately 20 minutes and then a solution of 4.5 g. of sodium sulfite in 81 ml. of water was added with stirring. The mixture so obtained was concentrated under reduced pressure to a volume of approximately 250 ml. The concentrate was cooled and diluted with an equal volume of water. The solid which separated was isolated by filtration, washed with water, and dried in vacuo. The dried material was heated with stirring under reflux for 24 hours with a mixture of 247 ml. of acetone and 8.45 g. of anhydrous potassium acetate. The reaction mixture was cooled and diluted, with stirring, with 169 ml. of methylene chloride. The insoluble material was isolated by filtration and washed with methylene chloride. The methylene chloride washings and filtrate were combined and evaporated to dryness. The residue was recrystallized from a mixture of acetone and Skellysolve B (commercial hexanes). There was thus obtained 3.43 g. of 6α-methyl-9β,11β-oxidopregna-1,4,16-triene-3,20-dione in the form of a crystalline solid having a melting point of 198 to 210° C.

C. 6α-METHYL-9α-FLUORO-11β-HYDROXYPREGNA-1,4,16-TRIENE-3,20-DIONE

A solution of 5.05 g. of 6α-methyl-9β,11β-oxidopregna-1,4,16-triene-3,20-dione in 16 ml. of methylene chloride was cooled in a Dry Ice-acetone bath and added to a solution, maintained in a Dry Ice-acetone bath, of 6.15 g. of anhydrous hydrogen fluoride in 11 ml. of tetrahydrofuran. The resulting mixture was maintained at approximately 4° C. for several hours and then allowed to stand at room temperature (approximately 25° C.) for a short period. The mixture so obtained was added cautiously, with stirring, to a mixture of 25.3 g. of potassium carbonate, ice, and 500 ml. of water. The aqueous mixture so produced was extracted three times with methylene chloride and the methylene chloride extracts were combined, washed with water, and dried over anhydrous sodium sulfate. The dried methylene chloride solution was evaporated to dryness and the residue was recrystallized from a mixture of acetone and Skellysolve B. There was thus obtained 6α-methyl - 9α - fluoro-11β-hydroxypregna-1,4,16-triene-3,20-dione in the form of a crystalline solid having a melting point of 278 to 284° C.; $[\alpha]_D$ +131° (chloroform).

*Analysis.*—Calcd. for $C_{22}H_{27}FO_3$: C, 73.74; H, 7.50; F, 5.21. Found: C, 73.46; H, 7.88; F, 5.00.

D. 9α - FLUORO - 11β - HYDROXY-2',6α-DIMETHYL-Δ$^{1,4}$-3-KETO-6'β-METHOXY - 5',6' - DIHYDROANDROSTANO-[16,17α-c]-PYRAN

An autoclave was charged with 80 ml. of methyl vinyl ether, 5.0 g. of 9α-fluoro-6α-methyl-11β-hydroxypregna-1,4,16-triene-3,20-dione and 0.1 g. of hydroquinone; nitrogen was introduced at an initial pressure of approximately 10 p.s.i. The autoclave was sealed and heated with agitation at 200° C. for 24 hours. The reaction product so obtained was removed from the autoclave and evaporated to dryness. The residue was dissolved in a small quantity of methylene chloride and chromatographed on a column of 250 g. of magnesium silicate (Florisil). The column was eluted with Skellysolve B containing increasing proportions of acetone and those fractions, which were found by infrared and paper chromatographic analysis to contain the desired end product, were combined and evaporated to dryness. The residue was recrystallized from methanol. There was thus obtained 1.6 g. of 9α-fluoro - 11β - hydroxy-2',6α-dimethyl-Δ$^{1,4}$-3-keto-6'β-methoxy - 5',6-dihydroandrostano-[17,16α-c]-pyran in the form of a crystalline solid having a melting point of 215 to 222° C. An analytical sample having a melting point of 220 to 225° C. was obtained by further recrystallization from methanol.

*Analysis.*—Calcd. for $C_{25}H_{33}O_4F$: C, 72.11; H, 7.93. Found: C, 72.14; H, 8.11.

The infrared spectrum of the above compound (mineral oil mull) exhibited maxima at 3305, 1695, 1657, 1614, 1240, 1150, 1125, 1065 and 1021 reciprocal centimeters. The ultraviolet spectrum of the compound (ethanol solution) exhibited a maximum at 238 millimicrons ($\epsilon$=16,550).

Using the above procedure set forth in parts A, B, C, and D, but replacing 6α-methyl-17α-hydroxy-1,4,9(11)-pregnatriene-3,20-dione employed as starting material in part A by 6α-methyl-17α,21-dihydroxy-1,4,9(11)-pregnatriene-3,20-dione 21-acetate (U.S. 2,964,542), there is obtained 9α - fluoro-11β-hydroxy-6α-methyl-Δ$^{1,4}$-3-keto-6'β-methoxy - 2' - acetoxymethyl - 5',6' - dihydroandrostano-[17,16α-c]-pyran in the form of a crystalline solid.

PREPARATION 2

*6α,9α - difluoro - 11β - hydroxy-Δ$^{1,4}$-3-keto-6'β-methoxy-2' - acetoxymethyl - 5',6' - dihydroandrostano-[17,16α-c]-pyran*

A. 6α-FLUORO-21-ACETOXY-1,4,9(11),16-PREGNATETRA-ENE-3,20-DIONE

A solution of 10 g. of 6α-fluoro-17α,21-dihydroxy-1,4,9(11) - pregnatriene - 3,20 - dione, 21-acetate (U.S. 2,838,499) in 28 ml. of pyridine was stirred at room temperature while a solution of 5.6 g. of N-bromoacetamide in 23 ml. of pyridine was added all at once. The resulting mixture was stirred in the dark for a short period before being cooled to 10° C. and added slowly to 25 ml. of a cooled, saturated solution of sulfur dioxide in pyridine. After the addition was complete, the resulting mixture was stirred for a short period at room temperature (25° C.) before being passed slowly with stirring into 500 ml. of ice-water. The solid which separated was isolated by filtration, washed with water, and dried. The material so obtained was dissolved in a small quantity of methylene chloride and chromatographed on a column of alumina. The column was eluted with benzene containing increasing proportions of acetone and those fractions which, on the basis of infrared analysis, were found to contain the desired material, were combined and evaporated to dryness. The residue was recrystallized from a mixture of acetone and Skellysolve B. There was thus obtained 2.40 g. of 6α-fluoro-21-acetoxy-1,4,9(11),16-pregnatetraene-3,20-dione in the form of a crystalline solid having a melting point of 173 to 188° C. An analytical sample having a melting point of 188 to 190° C. was obtained by further recrystallization from a mixture of acetone and Skellysolve B; [α]$_D$ +112° (chloroform).

*Analysis.*—Calcd. for $C_{23}H_{25}O_4F$: C, 71.85; H, 6.56; F, 4.94. Found: C, 72.05; H, 6.46; F, 4.62.

The infrared spectrum of the above material (mineral oil mull) exhibited maxima at 1746, 1678, 1637, 1611, 1582, 1240, and 1223 reciprocal centimeters. The ultraviolet spectrum of the compound (ethanol solution exhibited a maximum at 238 millimicrons ($\epsilon$=24,300).

B. 6α,9α-DIFLUORO-11β,21-DIHYDROXY-1,4,16-PREGNATRIENE-3,20-DIONE 21-ACETATE

Using the procedure in Preparation 1, parts B and C, but replacing the 6α-methylpregna-1,4,9(11),16-tetraene-3,20-dione employed as starting material in part B by 6α-fluoro - 21 - acetoxy-1,4,9(11),16-pregnatetraene-3,20-dione, there was obtained 6α,9α-difluoro-11β,21-dihydroxy-1,4,16-pregnatriene-3,20-dione 21-acetate in the form of a crystalline solid having a melting point of 209 to 210° C.

*Analysis.*—Calcd. for $C_{23}H_{26}O_5F_2$: C, 65.70; H, 6.23; F, 9.04. Found: C, 65.73; H, 6.29; F, 8.53.

The infrared spectrum of the above material (mineral oil mull) exhibited maxima at 3540, 3060, 1735, 1680, 1670, 1630, 1615, 1255, 1225, 1175, 1150 and 1070 reciprocal centimeters. The ultraviolet spectrum of the above material (ethanol solution) exhibited a maximum at 238 millimicrons ($\epsilon$=25,750).

C. 6α,9α - DIFLUORO - 11β - HYDROXY - 3 - KETO - Δ$^{1,4}$-2'-ACETOXYMETHYL - 6'β - METHOXY - 5',6' - DIHYDRO-ANDROSTANO-[17,16α-c]-PYRAN

Using the procedure set forth in Preparation 1, part D, but replacing 9α - fluoro-6α-methyl-11β-hydroxypregna-1,4,16-triene-3,20-dione by 6α,9α - difluoro-11β,21-dihydroxy-1,4,16-pregnatriene-3,20-dione 21-acetate, there is obtained 6α,9α - difluoro-11β-hydroxy-3-keto-Δ$^{1,4}$-2'-acetoxymethyl - 6'β - methoxy - 5',6' - dihydroandrostano-[17,16α-c]-pyran in the form of a crystalline solid having a melting point of 185 to 192° C.

Similarly, using the procedure set forth in Preparation 1, part D, but replacing 9α-fluoro-5α-methyl-11β-hydroxypregna-1,4,16-triene-3,20-dione by 6α-fluoro-21-acetoxy - 4,9(11),16 - pregnatriene-3,20-dione [prepared from 6α - fluoro-17α,21-dihydroxy-4,9(11)-pregnadiene-3,20-dione 21-acetate (U.S. Patent 2,838,545) by the procedure described in part A above], 6α-fluoro-4,16-pregnadiene-3,11,20-trione [prepared from 6α-fluoro-17α-hydroxy-4-pregnene-3,11,20-trione (U.S. Patent 2,838,541) by the procedure described in part A above], 6α-fluoro-1,4,16-pregnatriene-3,20-dione [prepared from 6α-fluoro-17α-hydroxy - 1,4 - pregnadiene-3,20-dione (U.S. Patent 2,838,531) by the procedure described in part A above], and 6α-fluoro - 21 - acetoxy-1,4,9(11),16-pregnatetraene-3,20-dione, there are obtained 6α-fluoro-3-keto-Δ$^{4,9(11)}$-2'-acetoxymethyl-, 6α-fluoro-3,11-diketo-Δ$^4$-2'-methyl-, 6α-fluoro - 3 - keto-Δ$^{1,4}$-2'-methyl-, and 6α-fluoro - 3 - keto-Δ$^{1,4,9(11)}$-2'-acetoxymethyl-6'β-methoxy - 5',6' - dihydroandrostano-[17,16α-c]-pyran, respectively.

PREPARATION 3

*9α-fluoro - 11β - hydroxy - 2',6',6α - trimethyl-Δ$^{1,4}$-3-keto-6'β-methoxy-5',6'-dihydroandrostano-[17,16α-c]-pyran*

Using the procedure described in Preparation 1, part D, but replacing methyl vinyl ether by 2-methoxypropene-1 there is obtained 9α-fluoro-11β-hydroxy-2',6',6α-trimethyl-Δ$^{1,4}$-3-keto - 6'β - methoxy - 5',6' - dihydroandrostano-[17,16α-c]pyran.

Similarly, using the procedure described in Preparation 1, part D, but replacing the methyl vinyl ether by other 2-methoxyalkenes-1 there are obtained the corresponding 9α - fluoro-11β-hydroxy-2',6α-dimethyl-6'-alkyl-Δ$^{1,4}$ - 3 - keto - 6'β - methoxy - 5',6' - dihydroandrostano-[17,16α-c]-pyrans.

In the same manner as described in Preparation 1, part D, but replacing the 9α-fluoro-6α-methyl-11β-hydroxypregna-1,4,16-triene-3,20-dione by the appropriate Δ¹⁶-pregnene and replacing the methyl vinyl ether by the appropriate 2-methoxyalkenes-1, there are obtained the corresponding 6'-alkyl-6'β-methoxy-5',6'-dihydroandrostano-[17,16α-c]-pyrans such as:

Δ⁵-3β-acetoxy-2'methyl-6'β-methoxy - 6' - propyl-5',6'-dihydroandrostano-[17,16α-c] - pyran (from 16-dehydropregnenolone acetate and 2-methoxypentene-1), Δ⁴-3-keto-6α-methyl-2' - methyl - 6'β - methoxy-6'-ethyl-5',6'-dihydroandrostano-[17,16α-c]-pyran (from 6α-methyl-16-dehydroprogesterone and 2-methoxybutene-1), Δ¹,⁴,⁹⁽¹¹⁾-3-keto-2',6',6α-trimethyl-6'β-methoxy - 5',6'-dihydroandrostano-[17,16α-c]-pyran (from 6α-methylpregna-1,4,9(11),16-tetraene-3,20 - dione and 2-methoxypropene-1), and Δ⁵-3β-acetoxy-2'-acetoxymethyl-6' - methyl - 6'β-methoxy-5',6'-dihydroandrostano - [17,16α - c] - pyran, (from pregna-5,16-diene-20-one-3,21-diol 3,21-diacetate and 2-methoxypropene-1).

EXAMPLE 1

*17β-bromo-6α-methyl-16α-(2-oxoethyl)-17-isopregn-4-ene-3,20-dione*

A. A solution of 13.2 g. of N-bromoacetamide in 240 ml. of t-butyl alcohol was added rapidly with stirring to a solution of 24.0 g. of 2',6-dimethyl-3-keto-Δ⁴-6'β-methoxy-5',6'-dihydroandrostano-[17,16α-c]-pyran in 800 ml. of methylene chloride and 1080 ml. of t-butyl alcohol. The temperature of the mixture was maintained at approximately 2° C. throughout the addition. To the resulting mixture was added dropwise with stirring over a period of 20 minutes a solution of 68 ml. of 20% perchloric acid in 360 ml. of water, maintaining the temperature of the mixture below 5° C. throughout. After the addition was complete, the mixture was stirred for a short period before being treated with a solution of 13.2 g. of sodium sulfite in 200 ml. of water. The mixture so obtained was passed into an excess of ice water and the organic material was extracted with methylene chloride. The methylene chloride extract was washed with aqueous sodium bicarbonate solution and then with water before being dried over anhydrous sodium sulfate. The dried methylene chloride solution was evaporated to dryness under reduced pressure. The residue was dissolved in methylene chloride and chromatographed on a column of magnesium silicate (Florisil). The column was eluted with Skellysolve B containing increasing proportions of acetone and those fractions which, on the basis of infrared analysis, were found to contain the desired material were combined and evaporated to dryness. The residue was recrystallized from a mixture of Skellysolve B and acetone. There was thus obtained 17β-bromo-6α-methyl-16α-(2-oxoethyl)-17-isopregn-4-ene-3,20-dione in the form of a crystaline solid having a melting point of 140 to 147° C. with decomposition.

*Analysis.*—Calcd. for $C_{24}H_{33}O_3Br$: C, 64.15; H, 7.35; Br, 17.82. Found: C, 63.87; H, 7.30; Br, 17.48.

The infrared spectrum of the compound (mineral oil mull) exhibited maxima at 2720, 1721, 1698, 1665, and 1605 reciprocal centimeters. The ultraviolet spectrum of the compound (ethanol solution) exhibited a maximum at 240 millimicrons ($\epsilon$=16,850).

B. A solution of 13.2 g. of sodium acetate in 92 ml. of water was added with stirring to a solution of 24 g. of 2',6α-dimethyl-3-keto-Δ⁴-6'β - methoxy - 5',6'-dihydroandrostano-[17,16α-c]-pyran in 1230 ml. of acetone maintained at 0° C. To the mixture so obtained was added with stirring 24.4 g. of N-bromosuccinimide followed dropwise over 15 minutes by a solution of 17.6 ml. of acetic acid in 92 ml. of water. The resulting mixture was stirred for a short period at 0° C. before being decomposed by the addition of an excess of aqueous sodium thiosulfate. The mixture so obtained was extracted with ether and the extract was washed with water, dried over anhydrous magnesium sulfate and evaporated to dryness. The residue was subjected to chromatography using the procedure described under part A above. There was thus obtained 8.93 g. of 17β-bromo-6α-methyl-16α-(2-oxoethyl)-17-isopregn-4-ene-3,20-dione in the form of a crystalline solid having a melting point of 130 to 134° C., with decomposition.

Using either of the procedures set forth under parts A and B above, but replacing the 2'6β-dimethyl-3-keto-Δ⁴-6'β-methoxy-5',6'-dihydroandrostano - [17,16α - c]-pyran employed as starting material by, 9α-fluoro-11β-hydroxy-2',6α-dimethyl-3-keto-Δ¹,⁴-,
9α-fluoro-11β-hydroxy-6α-methyl-3-keto-Δ¹,⁴ - 2'-acetoxymethyl-,
6α,9α-difluoro-11β-hydroxy-3-keto - Δ¹,⁴ - 2'-acetoxymethyl-,
6α-fluoro-3-keto-Δ⁴,⁹⁽¹¹⁾-2'-acetoxymethyl-,
6α-fluoro-3,11-diketo-Δ⁴-2'-methyl-,
6α-fluoro-3-keto-Δ¹,⁴-2'-methyl-,
6α-fluoro-3-keto-Δ¹,⁴,⁹⁽¹¹⁾-2'-acetoxymethyl-,
Δ⁵-3β-acetoxy-2'-methyl-,
Δ⁴-3-keto-2'-methyl-,
Δ¹,⁴,⁹⁽¹¹⁾-3-keto-2'6α-dimethyl-,
Δ⁵-3β-acetoxy-2'-acetoxymethyl-,
Δ⁴-3,11-diketo-2'-methyl-,
Δ⁴-3-keto-11α-hydroxy-2'-methyl-,
Δ⁴-3-keto-11β-hydroxy-2'-methyl-,
Δ⁴-3-keto-11β-hydroxy-2'-acetoxymethyl-,
Δ⁴-3,11-diketo-2'-acetoxymethyl-,
Δ⁴-3-keto-2'-acetoxymethyl-,
Δ⁴-3-11-diketo-6α-methyl-2'-acetoxymethyl-,
Δ⁴-3-keto-11β-hydroxy-6α-methyl-2'-acetoxymethyl-,
Δ⁴,⁹⁽¹¹⁾-3-keto-6α-methyl-2'-acetoxymethyl-,
Δ¹,⁴-3-keto-6α,2'-dimethyl-,
Δ¹,⁴-3-keto-11β-hydroxy-2'-methyl-,
Δ¹,⁴-3,11-diketo-6α-methyl-2'-acetoxymethyl-,
Δ¹,⁴-3-keto-11β-hydroxy-6α-methyl-2'-acetoxymethyl-,
Δ¹,⁴,⁹⁽¹¹⁾-3-keto-6α-methyl-2'-acetoxymethyl-,
Δ¹,⁴-3,11-diketo-2'-methyl-,
Δ¹,⁴-3-keto-11α-hydroxy-2'-methyl-,
Δ¹,⁴-3-keto-11β-hydroxy-2'-acetoxymethyl-,
Δ¹,⁴-3-11-diketo-2'-acetoxymethyl-,
Δ¹,⁴-3-keto-2'-acetoxymethyl-,
Δ⁵-3β-acetoxy-2',6-dimethyl-,
3β-acetoxy-2'-methyl-,
3α-acetoxy-11-keto-2'-methyl-,
3α-acetoxy-11β-hydroxy-2'-methyl-,
3α-acetoxy-2'-methyl-,
Δ⁴-9α-fluoro-3-keto-11β-hydroxy-2'-acetoxymethyl-,
Δ⁴-9α-fluoro-3,11-diketo-2'-acetoxymethyl-,
Δ¹,⁴-9α-fluoro-3,11-diketo-2'-acetoxymethyl-,
Δ¹,⁴-9α-fluoro-3-keto-11β-hydroxy-2'-acetoxymethyl-,
Δ⁴-9α-fluoro-3,11-diketo-2'-methyl-,
Δ¹,⁴-9α-fluoro-3,11-diketo-2'methyl-6'β-methoxy-5',6'-dihydroandrostano-[17,16α-c]-pyran,
Δ¹,⁴-9α-fluoro-11β-hydroxy-3-keto-2',6',6α-trimethyl-,
Δ⁵-3β-acetoxy-2'-methyl-6'-propyl-,
Δ⁴-3-keto-6α-methyl-2'-'methyl-6'-ethyl-,
Δ¹,⁴,⁹⁽¹¹⁾-3-keto-2',6',6α-trimethyl-, and
Δ⁵-3β-acetoxy-2'-acetoxymethyl-6'-methyl-6'β-methoxy-5',6'-dihydroandrostano-[17,16α-c]-pyrans, there are obtained:

17β-bromo-9α-fluoro-6α-methyl-11β-hydroxy-16α-(2-oxoethyl)-17-isopregna-1,4-diene-3,20-dione,
17β-bromo-9α-fluoro-6α-methyl-11β-hydroxy-16α-(2-oxoethyl)-17-isopregna-1,4-diene-21-ol-3,20-dione 21-acetate,
17β-bromo-6α,9α-difluoro-11β-hydroxy-16α-(2-oxoethyl)-17-isopregna-1,4-diene-21-ol-3,20-dione 21-acetate,
17β-bromo-6α-fluoro-16α-(2-oxoethyl)-17-isopregna-4,9(11)-diene-21-ol-3,20-dione 21-acetate,
17β-bromo-6α-fluoro-16α-(2-oxoethyl)-17-isopregn-4-ene-3,11,20-trione, 17β-bromo-6α-fluoro-16α-(2-oxoethyl)-17-isopregna-
1,4-diene-3,20-dione,
17β-bromo-16α-(2-oxoethyl)-17-isopregna-
1,4,9(11)-triene-21-ol-3,20-dione 21-acetate,
17β-bromo-16α-(2-oxoethyl)-17-isopregn-5-en-
3β-ol-20-one 3β-acetate,
17β-bromo-16α-(2-oxoethyl)-17-isopregn-
4-ene-3,20-dione,
17β-bromo-6α-methyl-16α-(2-oxoethyl)-17-isopregna-
1,4,9(11)-triene-3,20-dione,
17β-bromo-16α-(2-oxoethyl)-17-isopregn-5-ene-
3β,21-diol-20-one 3β-acetate,
17β-bromo-16α-(2-oxoethyl)-17-isopregn-4-ene-
3,11,20-trione,
17β-bromo-16α-(2-oxoethyl)-17-isopregn-4-ene-11α-ol-
3,20-dione,
17β-bromo-16α-(2-oxotheyl)-17-isopregn-4-ene-21-ol-
3,20-dione,
17β-bromo-16α-(2-oxoethyl)-17-isopregn-4-ene-
11β,21-diol-3,20-dione 21-acetate,
17β-bromo-16α-(2-oxoethyl)-17-isopregn-4-ene-
21-ol-3,11,20-trione 21-acetate,
17β-bromo-16α-(2-oxoethyl)-17-isopregnene-4-ene-21-ol-
3,20-dione 21-acetate,
17β-bromo-6α-methyl-16α-(2-oxoethyl)-17-isopregn-
4-ene-21-ol-3,11,20-trione 21-acetate,
17β-bromo-6α-methyl-16α-(2-oxoethyl)-17-isopregn-4-
ene-11β,21-diol-3,20-dione 21-acetate,
17β-bromo-6α-methyl-16α-(2-oxoethyl)-17-isopregn-
4,9(11)-diene-21-ol-3,20-dione 21-acetate,
17β-bromo-6α-methyl-16α-(2-oxoethyl)-17-isopregna-
1,4-diene-3,20-dione,
17β-bromo-16α-(2-oxoethyl)-17-isopregna-1,4-diene-
11β-ol-3,20-dione,
17β-bromo-6α-methyl-16α-(2-oxoethyl)-17-isopregna-
1,4-diene-21-ol-3,11,20-trione 21-acetate,
17β-bromo-6α-methyl-16α-(2-oxoethyl)-17-isopregna-
1,4-diene-11β,21-diol-3,20-dione 21-acetate,
17β-bromo-6α-methyl-16α-(2-oxoethyl)-17-isopregna-
1,4,9(11)-triene-21-ol-3,20-dione 21-acetate,
17β-bromo-16α-(2-oxoethyl)-17-isopregna-1,4-diene-
3,11,20-trione,
17β-bromo-16α-(2-oxoethyl)-17-isopregna-1,4-diene-
11α-ol-3,20-dione,
17β-bromo-16α-(2-oxoethyl)-17-isopregna-1,4-diene-
11β,21-diol-3,20-dione 21-acetate,
17β-bromo-16α-(2-oxoethyl)-17-isopregna-1,4-diene-
21-ol-3,11,20-trione 21-acetate,
17β-bromo-16α-(2-oxoethyl)-17-isopregna-1,4-diene-
21-ol-3,20-dione 21-acetate,
17β-bromo-6α-methyl-16α-(2-oxoethyl)-17-isopregn-5-
ene-3β-ol-20-one 3β-acetate,
17β-bromo-16α-(2-oxoethyl)-17-isopregnane-3β-ol-
20-one 3β-acetate,
17β-bromo-16α-(2-oxoethyl)-17-isopregnane-3α-ol-
11,20-dione 3α-acetate,
17β-bromo-16α-(2-oxoethyl)-17-isopregnane-3α,11β-
diol-20-one 3α-acetate,
17β-bromo-16α-(2-oxoethyl)-17-isopregnane-3α-ol-
20-one 3α-acetate,
17β-bromo-9α-fluoro-16α-(2-oxoethyl)-17-isopregn-
4-ene-11β,21-diol-3,20-dione 21-acetate,
17β-bromo-9α-fluoro-16α-(2-oxoethyl)-17-isopregn-
4-ene-21-ol-3,11,20-trione 21-acetate,
17β-bromo-9α-fluoro-16α-(2-oxoethyl)-17-isopregna-
1,4-diene-21-ol-3,11,20-trione 21-acetate,
17β-bromo-9α-fluoro-16α-(2-oxoethyl)-17-isopregna-
1,4-diene-11β,21-diol-3,20-dione 21-acetate,
17β-bromo-9α-fluoro-16α-(2-oxoethyl)-17-isopregn-
4-ene-3,11,20-trione,
17β-bromo-9α-fluoro-16α-(2-oxoethyl)-17-isopregna-
1,4-diene-3,11,20-trione,
17β-bromo-9α-fluoro-6α-methyl-16α-(2-oxopropyl)-17-
isopregna-1,4-diene-11β-ol-3,20-dione,
17β-bromo-16α-(2-oxopentyl)-17-isopregn-5-ene-3β-ol-
20-one 3β-acetate,
17β-bromo-6α-methyl-16α-(2-oxobutyl)-17-isopregn-4-
ene-3,20-dione,
17β-bromo-6α-methyl-16α-(2-oxopropyl)-17-isopregna-
1,4,9(11)-triene-3,20-dione, and
17β-bromo-16α-(2-oxopropyl)-17-isopregn-5-ene-3β,21-
diol-20-one 3β-acetate, respectively.

EXAMPLE 2

*17β-bromo-6α-methyl-16α-(2-carbomethoxymethyl)-
17-isopregn-4-ene-3,20-dione*

A solution of 7.0 g. of 17β-bromo-6α-methyl-16α-(2-oxoethyl)-17-isopregn-4-ene-3,20-dione in 70 ml. of pyridine was admixed with a chromic acid:pyridine complex prepared from 7.0 g. of chromium trioxide and 70 ml. of pyridine. The mixture so obtained was allowed to stand for 18 hours at room temperature (approximately 25° C.). At the end of this time, 100 ml. of toluene and 200 ml. of water were added to the reaction mixture and the insoluble material which separated was removed by filtration. The organic layer of the filtrate was separated, washed with dilute hydrochloric acid, then with water, and was dried over anhydrous sodium sulfate. The dried solution was evaporated to dryness and the residue was dissolved in 1 l. of equal parts of methanol and methylene chloride. The solution so obtained was treated with an excess of ethereal diazomethane solution and the mixture was allowed to stand for 3 hours at room temperature (25° C.). At the end of this time, the excess diazomethane was decomposed by the addition of acetic acid and resulting solution was evaporated to dryness under reduced pressure. The residue was dissolved in methylene chloride and chromatographed on a column of magnesium silicate (Florisil). The column was eluted with Skellysolve B containing increasing proportions of acetone and those fractions, which on the basis of infrared analysis were found to contain the desired material, were combined and evaporated to dryness. The residue was recrystallized from methanol. There was thus obtained 1.73 g. of 17β-bromo-6α-methyl-16α-(2-carbomethoxymethyl)-17-isopregn-4-ene-3,20-dione in the form of a crystalline solid having a melting point of 125 to 127° C. An analytical sample having a melting point of 130 to 133° C. was obtained by further recrystallization from methanol.

*Analysis.*—Calcd. for $C_{25}H_{35}O_4Br$: C, 62.63; H, 7.31; Br, 16.7. Found: C, 62.08; H, 7.63; Br, 16.47.

The infrared spectrum of the compound (mineral oil mull) exhibited maxima at 1735, 1702, 1665, 1603, 1235, 1190, and 1175 reciprocal centimeters. The ultraviolet spectrum of the compound (ethanol solution) exhibited a maximum at 239 millimicrons ($\epsilon$=16,150).

Using the above procedure, but replacing 17β-bromo 6α - methyl - 16α - (2 - oxoethyl) - 17 - isopregn - 4 - ene-3,20-dione by any of the 16α-(2-oxethyl) compounds obtained as described at the end of Example 1, there are obtained the corresponding 16-(2-carbomethoxymethyl) compounds. Representative of the compounds so obtained are:

17β-bromo-9α-fluoro-6α-methyl-16α-(2-carbomethoxy-
methyl)-17-isopregna-1,4-diene-11β-ol-3,20-dione,
17β-bromo-6α,9α-difluoro-16α-(2-carbomethoxymethyl)-
17-isopregna-1,4-diene-11β,21-diol-3,20-dione 21-
acetate,
17β-bromo-6α-fluoro-16α-(2-carbomethoxymethyl)-17-
isopregna-4,9(11)-diene-21-ol-3,20-dione 21-acetate,
17β-bromo-6α-fluoro-16α-(2-carbomethoxymethyl)-17-
isopregn-4-ene-3,11,20-trione,
17β-bromo-6α-fluoro-16α-(2-carbomethoxymethyl)-17-
isopregna-1,4-diene-3,20-dione; and
17β-bromo-6α-fluoro-16α-(2-carbomethoxymethyl)-17-
isopregna-1,4,9(11)-triene-21-ol-3,20-dione 21-acetate.

Example 3

17α-hydroxy-6α-methyl-3,20-dioxopregn-4-ene-16α-acetic acid, γ-lactone

A mixture of 0.6 g. of 17β-bromo-6α-methyl-16α-(2-carbomethoxymethyl) - 17 - isopregn - 4 - ene - 3,20 - dione, 1.0 g. of lithium bromide, 1.0 g. of lithium carbonate, and 50 ml. of dimethylformamide was heated under reflux for 18 hours under an atmosphere of nitrogen. The resulting mixture was cooled and poured into water and the solid which separated was isolated by filtration, washed with water, and dried. This material was dissolved in methylene chloride and chromatographed on a column of magnesium silicate (Florisil). The column was eluted with Skellysolve B containing increasing proportions of acetone. Those fractions which, on the basis of infrared analysis, were found to contain the desired material were combined and evaporated to dryness. The residue was recrystallized twice from a mixture of Skellysolve B and acetone. There was thus obtained 17α - hydroxy - 6α - methyl - 3,20 - dioxopregn - 4 - ene-16α-acetic acid γ-lactone in the form of a crystalline solid having a melting point of 198 to 201° C.

Similarly using the above procedure but replacing 17β-bromo - 6α - methyl - 16α - (2 - carbomethoxymethyl)-17-isopregn-4-en-3,20-dione employed as starting material by other 16α-(2-carbomethoxymethyl) compounds obtained by subjecting the corresponding 16α-(2-oxoethyl) compounds shown at the end of Example 1 to the process described in Example 2, there are obtained the corresponding lactones of the 17α-hydroxy-16α-acetic acids. Representative of the compounds obtained in this manner are:

11β,17α-dihydroxy-9α-fluoro-6α-methyl-3,20-dioxo-pregna-1,4-diene-16α-acetic acid, γ-lactone,
11β,17α,21-trihydroxy-9α-fluoro-6α-methyl-3,20-dioxo-pregna-1,4-diene-16α-acetic acid, γ-lactone, 21 acetate,
11β,17α,21-trihydroxy-6α,9α-difluoro-3,20-dioxopregna-1,4-diene-16α-acetic acid, γ-lactone, 21-acetate,
17α,21-dihydroxy-6α-fluoro-3,20-dioxopregna-4,9(11)-diene-16α-acetic acid, γ-lactone, 21-acetate,
17α-hydroxy-6α-fluoro-3,11,20-triooxopregn-4-ene-16α-acetic acid, γ-lactone,
17α-hydroxy-6α-fluoro-3,20-dioxopregna-1,4-diene-16α-acetic acid, γ-lactone, and
17α,21-dihydroxy-6α-fluoro-3,20-dioxopregna-1,4,9(11)-triene-16α-acetic acid, γ-lactone, 21-acetate.

Example 4

17α-hydroxy-16α-(2-hydroxyethyl)-6α-methyl-3,20-dioxopregn-4-ene-16b,17-cyclic ether A. 17α - HYDROXY - 6α - METHYL - 3,20 - DIOXOPREGN-4-ENE-16α-ACETIC ACID γ-LACTONE 3,20-DISEMICARBAZIDE A mixture of 1 g. of 17α-hydroxy-6α-methyl-3,20-dioxopregn-4-ene-16α-acetic acid γ-lactone, 1 g. of sodium acetate in 1 ml. water, 1.4 g. of semicarbazide hydrochloride, and 20 ml. of ethanol is heated under reflux for 1 hr. The resulting mixture is concentrated under reduced pressure in an atmosphere of nitrogen and the concentrate is diluted with water. The mixture so obtained is acidified with dilute hydrochloric acid and the insoluble material is isolated by filtration, washed with water and dried. The dried material is recrystallized from aqueous ethanol. There is thus obtained 17α-hydroxy-6α-methyl-3,20-dioxopregn-4-ene-16α-acetic acid γ-lactone 3,20-disemicarbazone in the form of a crystalline solid.

B. 17α - HYDROXY - 16α - (2 - HYDROXYETHYL) - 6α-METHYL - 3,20 - DIOXOPREGN - 4 - ENE - 16b,17-CYCLIC ETHER, 3,20-DISEMICARBAZONE

A solution of 1 g. of 17α-hydroxy-6α-methyl-3,20-dioxopregn-4-ene-16α-acetic acid γ-lactone 3,20-disemicarbazone in 50 ml. of tetrahydrofuran is added to a mixture of boron trifluoride etherate (5 ml.) and sodium borohydride (0.15 g.) in diglyme (20 ml.). The resulting mixture is stirred with ice-bath cooling for a further period of 1 hour and then for a period of 2 hours at reflux. The reaction mixture is then decomposed by the dropwise addition of 50 ml. of 18% hydrochloric acid. The organic layer is separated, further ether added and the organic extract washed with water, dried over anhydrous sodium sulfate and evaporated to dryness. The residue is recrystallized from aqueous ethanol or, alternatively, purified by chromatography on Florisil. There is thus obtained 17α-hydroxy-16α-(2-hydroxyethyl)-6α-methyl-3,20-dioxopregn-4-ene - 16b,17-cyclic ether, 3,20-disemicarbazone in the form of a crystalline solid.

C. 17α - HYDROXY - 16α - (2 - HYDROXYETHYL) - 6α-METHYL - 3,20 - DIOXOPREGN - 4 - ENE - 16b,17-CYCLIC ETHER

The 17α-hydroxy-16α-(2 - hydroxyethyl) - 6α - methyl-3,20-dioxopregn-4-ene-16b,17 - cyclic ether 3,20-disemicarbazide obtained as described in Part B above is heated at 50 to 60° C. in a nitrogen atmosphere with an excess of a 50% aqueous solution of pyruvic acid in dimethylformamide until hydrolysis of the disemicarbazone is complete (as determined by paper chromatographic analysis. Water is added to the cooled solution and the resulting mixture is extracted with methylene chloride and the methylene chloride extract is washed several times with water before being dried over anhydrous sodium sulfate. The dried solution is evaporated to dryness and the residue is recrystallized from aqueous ethanol or alternatively purified by chromatography on Florisil. There is thus obtained 17α-hydroxy-16α-(2-hydroxyethyl)-6α-methyl-3,20-dioxopregn-4-ene-16b,17-cyclic ether in the form of a crystalline solid.

Similarly, using the procedure set forth in Parts A, B and C above but replacing 17α-hydroxy-6α-methyl-3,20-dioxopregn-4-ene-16α-acetic acid γ-lactone by other pregnane-17α-hydroxy-16α-acetic acid γ-lactones there are obtained the corresponding 17α-hydroxy 16α-(2-hydroxyethyl)-16b,17-cyclic ethers. Representative of the compounds obtained in this manner are:

11β,17α-dihydroxy-16α-(2-hydroxyethyl)-9α-fluoro-6α-methyl-3,20-dioxopregna-1,4-diene-16b,17-cyclic ether,
11β,17α,21-trihydroxy-16α-(2-hydroxyethyl)-9α-fluoro-6α-methyl-3,20-dioxopregna-1,4-diene-16b,17-cyclic ether 21-acetate,
11β,17α,21-trihydroxy-16α-(2 - hydroxyethyl) - 6α,9α-difluoro-3,20-dioxopregna-1,4-diene - 16b,17 - cyclic ether 21-acetate,
17α,21-dihydroxy-16α-(2-hydroxyethyl)-6α-fluoro-3,20-dioxo-pregna-4,9(11)-diene-16b,17-cyclic ether 21-acetate,
17α-hydroxy-16α-(2-hydroxyethyl)-6α-fluoro-3,11,20-trioxopregn-4-ene-16b,17-cyclic ether,
17α-hydroxy-16α-(2-hydroxyethyl)-6α-fluoro-3,20-dioxopregna-1,4-diene-16b,17-cyclic ether, and
17α,21-dihydroxy-16α-(2-hydroxyethyl)-6α-fluoro-3,20-dioxopregna-1,4,9(11)-triene-16b,17-cyclic ether 21-acetate.

Example 5

17α-hydroxy-6α-methyl-3,20-dioxopregn-4-ene-16α-acetaldehyde 16b,17-cyclic enol ether A. 17α - HYDROXY - 16α - (2 - HYDROXY - 2 - ETHYL-THIOETHYL) - 6α - METHYL - 3,20 - DIOXOPREGN - 4-ENE 16b,17-CYCLIC ETHER A mixture of 5.5 g. of 17β-bromo-6α-methyl-16α-(2-oxoethyl)-17-isopregn-4-ene-3,20-dione, 5.5 g. of anhydrous lithium bromide, 5.5 g. of lithium carbonate and 150 ml. of dimethylformamide (previously redistilled from phosphorus pentoxide) was heated for 18 hours at 120 to 130° C. with stirring under an atmosphere of nitrogen. The resulting mixture was cooled and diluted with benzene, and the organic layer was separated and washed three times with water. The benzene solution was dried over anhydrous sodium sulfate and evaporated to dryness under reduced pressure. The residue was dissolved in a small quantity of methylene chloride and chromatographed on a column of magnesium silicate (Florisil). The column was eluted with Skellysolve B containing increasing proportions of acetone and those fractions which, on the basis of infrared and paper chromatographic analysis, were found to contain the desired material, were combined and evaporated to dryness. Two main fractions were obtained:

(a) 2.206 g. of material which was recrystallized from a mixture of ether and Skellysolve B to give 17α-hydroxy-6α-methyl-3,20 - dioxopregn - 4 - ene - 16α - acetaldehyde 16b,17-cyclic enol ether in the form of a crystalline solid having a melting point of 150 to 153° C. An analytical sample having a melting point of 155 to 157° C. was obtained by two further recrystallizations from a mixture of acetone and Skellysolve B.

Analysis.—Calcd. for $C_{24}H_{32}O_3$: C, 78.22; H, 8.75. Found: C, 78.05; H, 8.76.

The ultraviolet spectrum of the compound (ethanol solution) exhibited maxima at 241 and 284 (shoulder) millimicrons. The infrared spectrum of the compound (mineral oil mull) exhibited maxima at 3085, 3040, 1708, 1673, 1612, 1193, 1138, 1057 and 1038 reciprocal centimeters.

(b) 1.28 g. of material which was recrystallized from ether to give 0.277 g. of 17α-hydroxy-6α-methyl-3,20-dioxopregn-4-ene-16α-acetaldehyde γ-lactol in the form of a crystalline solid which, after two further recrystallizations from a mixture of acetone and Skellysolve B, had a melting point of 184 to 188° C.

Similarly, using the above procedure but replacing the 17β-bromo-6α-methyl-16α-(2-oxoethyl) - 17 - isopregn-4-ene-3,20-dione employed as starting material by any of the 17β-bromo-16α-(2-oxoethyl)-17 - isopregnane compounds listed at the end of Example 1, there is obtained the corresponding 17α-hydroxy-pregnene - 16α - acetaldehyde 16b,17-cyclic enol ether. Representative of such 17α-hydroxypregnene - 16α - acetaldehyde 16b,17-cyclic enol ethers are:

11β,17α-dihydroxy-9α-fluoro-6α-methyl-3,20-dioxopregna-1,4-diene-16α-acetaldehyde 16b,17-cyclic enol ether, 11β,17α,21 - trihydroxy - 9α-fluoro-6α-methyl-3,20-dioxopregna-1,4-diene-16α-acetaldehyde 16b,17-cyclic enol ether, 21-acetate, 11β,17α-21 - trihydroxy-6α,9α-difluoro-3,20-dioxopregna-1,4-diene-16α-acetaldehyde 16b,17-cyclic enol ether, 21-acetate, 17α,21-dihydroxy-6α-fluoro - 3,20 - dioxopregna-4,9(11)-diene-16α-acetaldehyde 16b,17-cyclic enol ether 21-acetate, 17α-hydroxy-6α-fluoro-3,11,20-trioxopregn-4-ene-16α-acetaldehyde 16b,17-cyclic enol ether, 17α-hydroxy-6α-fluoro-3,20-dioxopregna-1,4-diene-16α-acetaldehyde 16b,17-cyclic enol ether, 17α,21-dihydroxy-6α-fluoro-3,20-dioxopregna-1,4,9(11)-triene-16α-acetaldehyde 16b,17-cyclic enol ether, 21-acetate, 17α,3β,21-trihydroxy-20-oxopregn-5-ene-16α-acetaldehyde 16b,17-cyclic enol ether, 3β,21-diacetate, 17α,3β-dihydroxy-6α-methyl-20-oxopregn-5-ene-16α-acetaldehyde 16b,17-cyclic enol ether, 3β-acetate, 17α,3β-dihydroxy-20-oxopregnane-16α-acetaldehyde 16b,17-cyclic enol ether, 3β-acetate, 17α-3α-dihydroxy-20-oxopregnane-16α-acetaldehyde 16b,17-cyclic enol ether, 3α-acetate, 17α-3α,11β-trihydroxy-20-oxopregnane-16α-acetaldehyde 16b,17-cyclic enol ether, 3α-acetate, 17α,11β-dihydroxy-9α-fluoro-6α-methyl-3,20-dioxopregna-1,4-diene-16α-(2-oxopropyl) 16b,17-cyclic enol ether, and 17α-hydroxy-6α-methyl-3,20-dioxopregn-4-ene-16α-(2-oxobutyl)-16b,17-cyclic enol ether.

EXAMPLE 6

*17α-hydroxy-16α-(2-hydroxyethyl)-6α-methyl-3,20-dioxopregn-4-ene 16b,17-cyclic ether*

A. 17α-HYDROXY - 16α - (2 - HYDROXY-2-ETHYLTHIOETHYL)-6α-METHYL-3,20-DIOXOPREGN-4-ENE - 16b,17-CYCLIC ETHER

A mixture of 1 g. of 17α-hydroxy-6α-methyl-3,20-dioxopregn-4-ene-16α-acetaldehyde 16b,17-cyclic enol ether, 0.1 g. of p-toluenesulfonic acid, and 10 ml. of ethyl mercaptan is maintained at room temperature (ca. 25° C.) for a period of several hours. The resulting product is evaporated to dryness and the residue is dissolved in methylene chloride. The methylene chloride solution is washed with dilute sodium carbonate solution and then with water before being dried over anhydrous sodium sulfate. The dried solution is evaporated to dryness and the residue is recrystallized from aqueous ethanol. There is thus obtained 17α - hydroxy - 16α - (2 - hydroxy - 2 - ethylthioethyl)-6α-methyl-3,20-dioxopregn-4-ene γ-lactone in the form of a crystalline solid.

B. 17α - HYDROXY - 16α - (2 - HYDROXYETHYL) - 6α-METHYL - 3,20 - DIOXOPREGN - 4 - ENE 16b,17-CYCLIC ETHER

A mixture of 1 g. of 17α-hydroxy-16α-(2-hydroxy-2-ethylthioethyl)-6α-methyl-3,20-dioxopregn - 4 - ene γ-lactone, 1 g. of Raney nickel and 25 ml. of ethanol is heated under reflux for 2 hours. The resulting mixture is filtered to remove the nickel and the filtrate is evaporated to dryness. The residue is recrystallized from aqueous ethanol. There is thus obtained 17α-hydroxy-16α-(2-hydroxyethyl) - 6α - methyl - 3,20 - dioxopregn - 4 - ene-16b,17-cyclic ether in the form of a crystalline solid.

Similarly, using the procedure described in Parts A and B above, but replacing the 17α-hydroxy-6α-methyl-3,20-dioxopregn-4-ene - 16α - acetaldehyde 16b,17 - cyclic enol ether employed as starting material by other 17α-hydroxy-16α-acetaldehyde 16b,17-cyclic enol ethers prepared as described at the end of Example 5, there are obtained the corresponding 17α - hydroxy - 16α-(2-hydroxyethyl)-16b,17-cyclic ethers. Representative of such compounds are:

11β,17α-dihydroxy-16α-(2-hydroxyethyl)-9α-fluoro-6α-methyl-3,20-dioxopregna-1,4-diene-16b,17-cyclic ether, 11β,17α,21-trihydroxy-16α-(2-hydroxyethyl)-9α-fluoro-6α-methyl-3,20-dioxopregna-1,4-diene-16b,17-cyclic ether 21-acetate, 11β,17α,21-trihydroxy-16α-(2-hydroxyethyl)-6α,9α-difluoro-3,20-dioxopregna-1,4-diene-16b,17-cyclic ether 21-acetate, 17α,21-dihydroxy-16α-(2-hydroxyethyl)-6α-fluoro-3,20-dioxopregna-4,9(11)-diene-16b,17-cyclic ether 21-acetate, 17α-hydroxy-16α-(2-hydroxyethyl)-6α-fluoro-3,11,20-trioxopregn-4-ene-16b,17-cyclic ether, 17α-hydroxy-16α-(2-hydroxyethyl)-6α-fluoro-3,20-dioxopregna-1,4-diene-16b,17-cyclic ether, 17α,21-dihydroxy-16α-(2-hydroxyethyl)-6α-fluoro-3,20-dioxopregna-1,4,9(11)-triene-16b,17-cyclic ether 21-acetate, 17α,3β,21-trihydroxy-16α-(2-hydroxyethyl)-20-oxopregn-5-ene-16b,17-cyclic ether 3β,21-diacetate, 17α,3β-dihydroxy-16α-(2-hydroxyethyl)-6α-methyl-20-oxopregn-5-ene-16b,17-cyclic ether 3β-acetate, 17α,3β-dihydroxy-16α-(2-hydroxyethyl)-20-oxopregnane-16b,17-cyclic ether 3β-acetate, 17α,3α-dihydroxy-16α-(2-hydroxyethyl)-20-oxopregnane-16b,17-cyclic ether 3α-acetate, and 17α,3α,11β-trihydroxy-16α-(2-hydroxyethyl)-20-oxopregnane-16b,17-cyclic ether 3α-acetate.

EXAMPLE 7

*17α-hydroxy-16α-(1,2,2-trihydroxyethyl)-6α-methyl-3,20-dioxopregn-4-ene-16b,17-cyclic ether*

A solution of 0.75 g. of 17α-hydroxy-6α-methyl-3,20-dioxopregn-4-ene-16α-acetaldehyde-16b,17-cyclic enol ether in 30 ml. of tetrahydrofuran and 30 ml. of ether was allowed to stand overnight at approximately 25° C. with 0.55 g. of osmium tetroxide. The resulting mixture was filtered and excess hydrogen sulfide was bubbled into the filtrate (A) and also into a solution (B) prepared by dissolving, in a mixture of equal parts of methylene chloride and ethanol, the solid recovered in the above filtration. Each of the solutions so treated was separately filtered and the filtrates were evaporated to dryness. The residue (0.54 g.) from filtrate (A) was recrystallized from ether to give 17α-hydroxy-16α-(1,2,2-trihydroxyethyl)-6α-methyl-3,20-dioxopregn-4-ene-16b,17-cyclic ether in the form of a crystalline solid which after two recrystallizations from ethyl acetate and Skellysolve B had a melting point of 190 to 193° C.

*Analysis.*—Calcd. for $C_{24}H_{34}O_5$: C, 71.61; H, 8.51. Found: C, 71.72; H, 8.35.

The ultraviolet spectrum of this compound (ethanol solution) exhibited a maximum at 241 m$\mu$ ($\epsilon$=15,550). The infrared spectrum of this compound (mineral oil mull) exhibited maxima at 3375, 1705, 1675, 1650, 1603, 1230, 1186, 1130, 1080, 1052, and 1018 reciprocal centimeters.

A further quantity of the above product was obtained by recrystallization from a mixture of ethyl acetate and Skellysolve B of the residue from the evaporation of solution (B) above.

Using the above procedure, but replacing the 17α-hydroxy-6α-methyl-3,20-dioxopregn-4-ene-16α-acetaldehyde 16b,17-cyclic enol ether employed as starting material by other 17α-hydroxypregnene-16α-acetaldehyde 16b,17-cyclic enol ethers prepared as described in Example 5 there are obtained the corresponding 17α-hydroxy-16α-(1,2,2-trihydroxyethyl) 16b,17-cyclic ethers. Representative such compounds are:

11β,17α-dihydroxy-16α-(1,2,2-trihydroxyethyl)-9α-fluoro-6α-methyl-3,20-dioxopregna-1,4-diene-16b,17-cyclic enol ether, 11β,17α,21-trihydroxy-16α-(1,2,2-trihydroxyethyl)-9α-fluoro-6α-methyl-3,20-dioxopregna-1,4-diene-16b,17-cyclic ether, 21-acetate, 11β,17α,21-trihydroxy-16α-(1,2,2-trihydroxyethyl)-6α,9α-difluoro-3,20-dioxopregna-1,4-diene-16b,17-cyclic ether, 21-acetate, 17α,21-dihydroxy-16α-(1,2,2-trihydroxyethyl)-6α-fluoro-3,20-dioxopregna-4,9(11)-diene-16b,17-cyclic ether, 21-acetate, 17α-hydroxy-16α-(1,2,2-trihydroxyethyl)-6α-fluoro-3,11,20-trioxopregn-4-ene-16b,17-cyclic ether, 17α-hydroxy-16α-(1,2,2-trihydroxyethyl)-6α-fluoro-3,20-dioxopregna-1,4-diene-16b,17-cyclic ether, 17α,21-dihydroxy-16α-(1,2,2-trihydroxyethyl)-6α-fluoro-3,20-dioxopregna-1,4,9(11)-triene-16b,17-cyclic ether 21-acetate, 17α,3β,21-trihydroxy-16α-(1,2,2-trihydroxyethyl)-20-oxopregn-5-ene-16b,17-cyclic ether 3β,21-diacetate, 17α,3β-dihydroxy-16α-(1,2,2-trihydroxyethyl)-6α-methyl-20-oxopregn-4-ene-16b,17-cyclic ether 3β-acetate, 17α,3β-dihydroxy-16α-(1,2,2-trihydroxyethyl)-20-oxopregnane-16b,17-cyclic ether 3β-acetate, 17α,3α-dihydroxy-16α-(1,2,2-trihydroxyethyl)-20-oxopregnane-16b,17-cyclic ether 3α-acetate, and 17α,3α,11β-trihydroxy-16α-(1,2,2-trihydroxyethyl)-20-oxopregnane-16b,17-cyclic ether 3α-acetate.

EXAMPLE 8

*16α-formyl-17α-hydroxy-6α-methylpregn-4-en-3,20-dione and 17α-formate thereof*

A solution of 0.22 g. of 17α-hydroxy-16α-(1,2,2-trihydroxyethyl)-6α-methyl-3,20-dioxopregn-4-ene-16b,17-cyclic ether in 15 ml. of benzene was treated with a solution of 0.5 g. of lead tetraacetate in 10 ml. of benzene and 5 ml. of toluene and the mixture was stirred for 1 hour at room temperature. At the end of this period, the reaction mixture was poured into water. The organic layer was separated and the aqueous layer was extracted with benzene. The combined organic layer and benzene washings were washed with aqueous sodium thiosulfate solution and then with water before being dried over anhydrous sodium sulfate and evaporated to dryness. The residue (0.213 g.) was dissolved in methylene chloride and chromatographed on magnesium silicate (Florisil). The column was eluted with Skellysolve B containing increasing proportions of acetone and those fractions which, on the basis of infrared analysis, were found to contain the desired material were combined and evaporated to dryness. The residue was recrystallized from a mixture of Skellysolve B and acetone. There was thus obtained 16α-formyl-17α-hydroxy-6α-methylpregn-4-ene-3,20-dione in the form of a crystalline solid which, after two further recrystallizations from a mixture of acetone and Skellysolve B, had a melting point of 180 to 185° C.

*Analysis.*—Calcd. for $C_{23}H_{32}O_4$: C, 74.17; H, 8.66. Found: C, 74.39; H, 8.59.

The ultraviolet spectrum of the compound (ethanol solution) exhibited a maximum at 240 millimicrons ($\epsilon$=16,030). The infrared spectrum of the compound (mineral oil mull) exhibited maxima at 3445, 2745, 1700, 1695, 1670, 1605, 1241, 1225, 1196, 1173, and 1110 reciprocal centimeters.

The above experimental procedure was repeated except that the chromatography of the crude reaction product was omitted. Instead, the product from evaporation of the benzene was triturated with ether and the solid which separated was isolated by filtration and recrystallized once from a mixture of methylene chloride and Skellysolve B and then twice from a mixture of ethyl acetate and Skellysolve B to give 16α-formyl-17α-hydroxy-6α-methylpregn-4-ene-3,20-dione 17α-formate in the form of a crystalline solid having a melting point of 186 to 189° C.

*Analysis.*—Calcd. for $C_{24}H_{32}O_5$: C, 71.97; H, 8.05. Found: C, 71.74; H, 8.21.

The ultraviolet spectrum of the compound (ethanol solution) exhibited a maximum at 240 millimocrons ($\epsilon$=16,250). The infrared spectrum of the compound (mineral oil mull) exhibited maxima at 2740, 1725, 1710, 1674, 1610, 1205, 1185, 1155 and 1092 reciprocal centimeters.

EXAMPLE 9

*16α-formyl-17α-hydroxy-6α-methylpregn-4-ene-3,20-dione*

A solution of 1.84 g. of 17α-hydroxy-6α-methyl-3,20-dioxopregn-4-ene-16α-acetaldehyde 16b,17-cyclic enol ether in 60 ml. of tetrahydrofuran and 30 ml. of water was stirred for 10 minutes with 53 mg. of osmium tetroxide. To the mixture so obtained was added, with stirring over a period of 30 minutes, a total of 2.5 g. of powdered sodium periodate. When the addition was complete, the mixture was stirred for a further 1.5 hours at room temperature (approximately 25° C.) before an excess of water was added. The resulting mixture was extracted with methylene chloride and the methylene chloride extracts were combined and washed with water until the aqueous washings gave a negative starch iodide test. The methylene chloride extracts were then dried over anhydrous sodium sulfate and evaporated to dryness. The residue was dissolved in a small quantity of methylene chloride and chromatographed on a column of magnesium silicate (Florisil). The column was eluted with Skellysolve B containing increasing proportions of acetone and those fractions which, on the basis of infrared analysis, were found to contain the desired material, were combined and evaporated to dryness. The residue was recrystallized from a mixture of acetone and Skellysolve B. There was thus obtained 1.08 g. of 16α-formyl-17α-hydroxy-6α-methylpregn-4 - ene-3,20-dione in the form of a crystalline solid having a melting point of 188 to 191° C. and identical to the material obtained as described in Example 8.

Similarly, using the above procedure but replacing the 17α-hydroxy-6α-methyl - 3,20-dioxopregn - 4ene-16-αacetalehyde16b,17-cyclic enol ether employed as starting material by other 17α-hydroxy-16α-acetaldehyde 16b,17-cyclic enol ethers prepared as described in Example 5, there are obtained the corresponding 16α-formyl-17α-hydroxy compounds. Representative of such compounds are:

16α-formyl-11β,17α-dihydroxy-9α-fluoro-6α-methyl-3,20-dioxopregna-1-4-diene,
16α-formyl-11β,17α,21-trihydroxy-9α-fluoro-6α-methyl-3,20-dioxopregna-1,4-diene-21-acetate,
16α-formyl-11β,17α,21-trihydroxy-6α-difluoro-3,20-dioxopregna-1,4-diene, 21-acetate,
16α-formyl-17α-hydroxy-6α-fluoro-3,20-dioxopregna-4,9(11)-diene 21-acetate,
16α-formyl-17α-hydroxy-6α-fluoro-3,11,-20-trioxopregn-4-ene,
16α-formyl-17α-hydroxy-6α-fluoro-3,20-dioxopregna-1,4-diene,
16α-formyl-17α,21-dihydroxy-6α-fluoro-3,20-dioxopregna-1,4,9(11)-triene 21-acetate,
16α-formyl-17α,3β,21-trihydroxy-20-oxopregn-5-ene 3β,21-diacetate,
16α-formyl-17α,3β-dihydroxy-6α-methyl-20-oxopregn-5-ene 3β-acetate,
16α-formyl-17α,3β-dihydroxy-20-oxopregnane 3β-acetate,
16α-formyl-17α,3α-dihydroxy-20-oxopregnane 3α-acetate, and
16α-formyl-17α,3α,11β-trihydroxy-20-oxopregnane-3α-acetate.

EXAMPLE 10

*11β,17α,21-trihydroxy - 9α-fluoro-6α-methyl - 3,20-dioxopregna-1,4-diene-16α-acetaldehyde 16b,17-cyclic ether*

A solution of 1 g. of 11β,17α,21-trihydroxy-9α-fluoro-6α-methyl-3,20-dioxopregna - 1,4-diene-16α-acetaldehyde 16b,17-cyclic ether 21-acetate in 100 ml. of methanol is freed from oxygen and carbon dioxide by bubbling nitrogen therethrough. A solution of 1 g. of potassium bicarbonate in 10 ml. of water is similarly freed of oxygen and carbon dioxide. The two solutions are mixed and the mixture is stirred in an atmosphere of nitrogen for several hours. A slight excess of aqueous acetic acid is then added and the resulting mixture is evaporated under reduced pressure to remove the methanol. The solid which has separated from the residue is isolated by filtration, washed with water, and dried. There is thus obtained 11β,17α,21-trihydroxy - 9α-fluoro-6α - methyl-3,20-dioxopregna - 1,4-diene-16α - acetaldehyde 16b,17-cyclic ether in the form a crystalline solid.

Using the above procedure other 21-acylates and/or 3,21-diacylates of the invention are converted to the corresponding free 21-alcohols or 3,21-diols of the invention. For example, using the above procedure, the following compounds can be hydrolyzed to the corresponding free-alcohols:

11β(17α,21-trihydroxy-9α-fluoro-6α-methyl-3,20-dioxopregna-1,4-diene-16α-acetic acid γ-lactone, 21-acetate,
11β,17α,21-trihydroxy-6α,9α-difluoro-3,20-dioxopregna-1,4-diene-16α-acetic acid γ-lactone 21-acetate,
17α,21-dihydroxy-6α-fluoro-3,20-dioxopregn-4,9(11)-diene-16α-acetic acid γ-lactone 21-acetate,
17α,21-dihydroxy-6α-fluoro-3,20-dioxopregn-1,4,9,(11)-triene-16α-acetic acid γ-lactone, 21-acetate,
11β,17α,21-trihydroxy-16α-(2-hydroxyethyl)-9α-fluoro-6α-methyl-3,20-dioxopregna-1,4-diene-16b,17-cyclic ether 21-acetate,
11β,17α,21-trihydroxy-16α-(2-hydroxyethyl)-6α,9α-difluoro-3,20-dioxopregna-1,4-diene-16b,17-cyclic ether 21-acetate,
17α,21-dihydroxy-16α-(2-hydroxyethyl)-6α-fluoro-3,20-dioxopregna-4,9(11)-diene-16b,17-cyclic ether 21-acetate,
17α,21-dihydroxy-16α-(2-hydroxyethyl)-6α-fluoro-3,20-dioxopregna-1,4,9(11)-triene-16b,17-cyclic ether 21-acetate,
11β,17α,21-trihydroxy-6α,9α-difluoro-3,20-dioxopregna-1,4-diene-16α-acetaldehyde 16b,17-cyclic enol ether 21-acetate,
17α,21-dihydroxy-6α-fluoro-3,20-dioxopregna-4,9(11)-diene-16α-acetaldehyde 16b,17-cyclic enol ether 21-acetate,
17α,21-dihydroxy-6α-fluoro-3,20-dioxopregna-1,4,9(11) triene-16α-acetaldehyde 16b,17-cyclic enol ether 21-acetate,
17α,3β,21-trihydroxy-20-oxopregn-5-ene-16α-acetaldehyde 16b,17-cyclic enol ether 3β-acetate,
17α,3β-dihydroxy-6α-methyl-20-oxopregn-5-ene-16α-acetaldehyde 16b,17-cyclic enol ether 3β-acetate,
17α,3β-dihydroxy-20-oxopregnane-16α-acetaldehyde 16b,17-cyclic enol ether 3β-acetate,
17α,3α-dihydroxy-20-oxopregnane-16α-acetaldehyde 16b,17-cyclic enol ether, 3α-acetate, and
17α,3α,11β-trihydroxy-20-oxopregnane-16α-acetaldehyde 16b,17-cyclic enol ether 3α-acetate.

EXAMPLE 11

*16α-cyano-17α-hydroxy-6α-methylpregn-4-ene-3,20-dione*

To a solution of 0.36 g. of 16α-formyl-17α-hydroxy-6α-methylpregn-4-ene-3,20-dione in 15 ml. of benzene was added 0.36 g. of O,N-bistrifluoroacetylhydroxylamine followed by 0.23 ml. of pyridine. The mixture so obtained was warmed on the steam bath until homogeneous and then was allowed to stand for 18 hours at approximately 25° C. The solid which had separated was isolated by filtration and washed with ether on the filter. There was thus obtained 0.208 g. of 16α-cyano-17α-hydroxy-6α-methylpregn-4-ene-3,20-dione in the form of a crystalline solid having a melting point of 265 to 270° C. An analytical sample having a melting point of 267 to 274° C. was obtained by further recrystallization from methanol.

*Analysis.*—Calcd. for $C_{23}H_{31}O_3N$: C, 74.76; H, 8.46; N, 3.79. Found: C, 74.36; H, 8.12; N, 3.76.

The infrared spectrum of the compound (mineral oil mull) exhibited maxima at 3410, 1706, 1650, 1595, 1240, 1236, 1192 and 1097 reciprocal centimeters. The ultraviolet spectrum of the compound (ethanol solution) exhibited a maximum at 240 millimicrons ($\epsilon$=16,000).

Using the above procedure but replacing the 16α-formyl-17α-hydroxy-6α-methylpregn-4-ene-3,20-dione employed as starting material by other 16α-formyl-17-hydroxy compounds of the invention (produced as described in Example 9) there are obtained the corresponding 16α-cyano-17α-hydroxy compounds. Representative of such 16α-cyano compounds are:

16α-cyano-17αhydroxy-9α-fluoro-6α-methyl-3,20-dioxopregna-1,4-diene,
16α-cyano-11β, 17α,21-trihydroxy-9α-fluoro-6α-methyl-3,20-dioxopregna-1,4-diene-21-acetate,
16α-cyano-11β,17α,21-trihydroxy-6α,9α-difluoro-3,20-dioxopregna-1,4-diene 21-acetate,
16α-cyano-17α,21-dihydroxy-6α-fluoro-3,20-dioxopregna-4,9(11)-diene 21-acetate,
16α-cyano-17α-hydroxy-6α-fluoro-3,11,20-trioxopregn-4-ene, 16α-cyano-17α-hydroxy-6α-fluoro-3,20-dioxopregna-1,4-diene, 16α-cyano-17α,21-dihydroxy-6α-fluoro-3,20-dioxopregn-1,4,9(11)-triene-21-acetate, 16α-cyano-17α,3β,21-trihydroxy-20-oxopregn-5-ene 3β,21-diacetate, 16α-cyano-17α,3β-dihydroxy-6α-methyl-20-oxopregn-5-ene 3β-acetate, 16α-cyano-17α,3β-dihydroxy-20-oxopregnane 3β-acetate, 16α-cyano-17α,3α-dihydroxy-20-oxopregnane 3α-acetate, and 16α-cyano-17α,11β-trihydroxy-20-oxopregnane 3α-acetate.

Example 12

*16α-cyano-17α-hydroxy-6α-methylpregn-4-ene 3,20-dione 17α-acetate*

To a suspension of 0.1 g. of 16α-cyano-17α-hydroxy-6α-methylpregn-4-ene-3,20-dione in 10 ml. of carbon tetrachloride and 3 ml. of acetic anhydride was added 60 mg. of 2,4-dinitrobenzenesulfonic acid and the mixture was stirred at approximately 25° C. for 2 hours. The mixture so obtained was poured into 100 ml. of saturated sodium bicarbonate solution and the carbon tetrachloride was removed from the resulting mixture by distillation under reduced pressure. The residual suspension was treated with 20 ml. of tetrahydrofuran and 100 ml. of methanol and the mixture so produced was stirred overnight at approximately 25° C. The insoluble material (enol acetate) remaining in the reaction mixture at the end of this time was isolated by filtration, washed with water and dried. The dried material was then heated on the steam bath for 10 minutes with 50 ml. of methanol containing 0.5 ml. of concentrated hydrochloric acid. The resulting solution was cooled and 20 ml. of water was added. The diluted solution was evaporated under reduced pressure to remove the methanol and the solid which separated in the aqueous residue was isolated by filtration, washed with water and dried. The dried material was dissolved in a small amount of methylene chloride and chromatographed on a column of magnesium silicate (Florisil). The column was eluted with Skellysolve B containing increasing proportions of acetone and those fractions which, on the basis of infrared analysis, were found to contain the desired product, were combined and evaporated to dryness. The residue was recrystallized from a mixture of Skellysolve B and acetone to yield 76 mg. of 16α-cyano-17α-hydroxy-6α-methylpregn-4-ene-3,20-dione 17α-acetate in the form of a crystalline solid having a melting point of 202 to 207° C. An analytical sample having a melting point of 204 to 207° C. was obtained by further recrystallization from a mixture of Skellysolve B and acetone.

*Analysis.*—Calcd. for $C_{25}H_{33}O_4N$: C, 72.96; H, 8.08. Found: C, 73.21; H, 8.16.

The infrared spectrum of the above compound (mineral oil mull) exhibited maxima at 3050, 2240, 1740, 1710, 1660, 1610, 1238, 1180 and 1083 reciprocal centimeters. The ultraviolet spectrum of the compound (ethanol solution) exhibited a maximum at 239.5 millimicrons ($\epsilon$=16,650).

Using the above procedure, but replacing acetic anhydride by the appropriate hydrocarbon carboxylic acid anhydride there are obtained the corresponding 16α-cyano-17α-hydroxy-6α-methylpregn-4-ene-3,20-dione 17α-acylates such as the 17α-propionate, 17α-isobutyrate, 17α-phenylacetate, 17α-β-phenylpropionate, 17α-hemisuccinate, 17α-cyclopentylpropionate, 17α-benzoate, 17α-trimethylacetate and the like.

Similarly, by reacting other 17α-hydroxy or 17α,21-dihydroxy or 3,17α,21-trihydroxy compounds of the invention with the appropriate acid anhydride using the conditions described in Example 12 above, there are obtained the corresponding 17α-acylates, 17α,21-diacylates, or 3,17α,21-triacylates of the invention.

Example 13

*17α-hydroxy-16α-(hydroxymethyl)-6α-methylpregn-4-ene-3,20-dione*

A solution of 300 mg. of 16α-formyl-17α-hydroxy-6α-methylpregn-4-ene-3,20-dione in 20 ml. of tetrahydrofuran and 4 ml. of water was cooled to 0° C. To the cooled solution was added slowly with stirring a cold (0° C.) freshly prepared solution of 7.5 mg. of sodium borohydride in 3 ml. of water. The mixture was maintained at 0° C. throughout the addition and for a short period thereafter whilst stirring was maintained. The pH of the resulting mixture was adjusted to 6.0 by addition of 10% aqueous acetic acid solution and the tetrahydrofuran was then removed by distillation under reduced pressure. The solid which separated from the residue was collected by filtration, washed with water, and dried. The aqueous layer from the filtration was extracted with methylene chloride and the methylene chloride extract was dried over anhydrous sodium sulfate and evaporated to dryness. The residue was combined with the main fraction of insoluble material from the filtration and the mixture was dissolved in a small amount of methylene chloride and chromatographed on a column of magnesium silicate (Florisil). The column was eluted with Skellysolve B containing increasing proportions of acetone and those fractions which, on the basis of infrared analysis, were found to contain the desired material, were combined and evaporated to dryness. The residue was recrystallized from a mixture of acetone and Skellysolve B. There was thus obtained 0.145 g. of 17α-hydroxy-16α-(hydroxymethyl)-6α-methylpregn-4-ene-3,20-dione in the form of a crystalline solid having a melting point of 184 to 186° C. An analytical sample having a melting point of 183 to 187° C. was obtained by further recrystallization from a mixture of acetone and Skellysolve B.

*Analysis.*—Calcd. for $C_{23}H_{32}O_4$: C, 73.76; H, 9.15. Found: C, 73.75; H, 8.99.

The infrared spectrum of the compound (mineral oil mull) exhibited maxima at 3395, 3300, 1700, 1660, 1607, 1223, and 1196 reciprocal centimeters. The ultraviolet spectrum of the compound (ethanol solution) exhibited a maximum at 241 millimicrons ($\epsilon$=15,950).

A second crop (60 mg.) of the above material having a melting point of 179 to 184° C. was isolated from the mother liquors obtained in the above crystallization.

Using the above procedure but replacing the 16α-formyl-17α-hydroxy-6α-methylpregn-4-ene-3,20-dione employed as starting material by other 16α-formyl-17α-hydroxy compounds of the invention (prepared as described in Examples 8 and 9), there are obtained the corresponding 17α-hydroxy-16α-(hydroxymethyl) compounds. Typical of the latter compounds are:

11β,17α-dihydroxy-16α-(hydroxymethyl)-9α-fluoro-6α-methyl-3,20-dioxopregna-1,4-diene, 11β,17α,21-trihydroxy-16α-(hydroxymethyl-9α-fluoro-6α-methyl-3,20-dioxopregna-1,4-diene 21-acetate, 11,β,17α,21-trihydroxy-16α-(hydroxymethyl)-6α,9α-difluoro-3,20-dioxopregna-1,4-diene 21-acetate, 17α,21-dihydroxy-16α-(hydroxymethyl)-6-fluoro-3,20-dioxopregna-1,4,9(11)-triene 21-acetate, 17α-hydroxy-16α-(hydroxymethyl)-6α-fluoro-3,20-dioxopregna-1,4-diene, 17α-hydroxy-16α-(hydroxymethyl)-6α-fluoro-3,11,20-trioxopregn-4-ene, 17α,21-hydroxy-16α-(hydroxymethyl)-6α-fluoro-3,20-dioxopregna-1,4,9(11)-triene 21-acetae, 16α-(hydroxymethyl)-17α,3β,21-trihydroxy-20-oxopregn-5-ene 3β,21-diacetate, 16α-(hydroxymethyl)-17α,3β-dihydroxy-6α-methyl-20-oxopregn-5-ene 3β-acetate, 16α-(hydroxymethyl)-17α,3β-dihydroxy-20-oxopregnane 3β-acetate, 16α-(hydroxymethyl)-17α,3α-dihydroxy-20-oxopregnane 3α-acetate, and 16α-(hydroxymethyl)-17α,3α,11β-trihydroxy-20-oxopregnane 3α-acetate.

The 21-acetates of 11β,17α,21-trihydroxy-16α-(hydroxymethyl) - 9α - fluoro-6α-methyl-3,20-dioxopregna-1,4 - diene, 11β,17α,21-trihydroxy-16α-(hydroxymethyl)-6α,9α - difluoro-3,20-dioxopregna-1,4-diene, 17α,21-dihydroxy-16α-(hydroxymethyl)-6α-fluoro-3,20-dioxopregna-4,9(11)-diene, and 17α,21-dihydroxy-16α-(hydroxymethyl)-6α-fluoro-3,20-dioxopregna-1,4,9(11)-triene obtained as described above can be converted to the corresponding free 21-hydroxy compounds using the procedure described in Example 10.

EXAMPLE 14

*17α-hydroxy-16α-(hydroxymethyl)-6α-methylpregn-4-ene-3,20-dione acetonide*

A mixture of 1 g. of 17α-hydroxy-16α-(hydroxyethyl)-6α-methylpregn-4-ene-3,20-dione and 50 ml. of acetone is stirred and 3 drops of 72% perchloric acid is added thereto. The resulting mixture is stirred at room temperature (approximately 25° C.) overnight and is then evaporated to dryness under reduced pressure. The residue is recrystallized from aqueous alcohol. There is thus obtained 17α - hydroxy - 16α - (hydroxymethyl)-6α-methylpregn-4-ene-3,20-dione acetonide in the form of a crystalline solid.

Using the above procedure but replacing acetone by methyl ethyl ketone, methyl isobutyl ketone, cyclohexanone, diethylketone, paraldehyde, benzaldehyde, phenylacetaldehyde, or furfural there are obtained the corresponding 16α,17α-(2'-butylidene)dioxy-16α,17α-(4'-methyl-2'-pentylidene)dioxy derivative, 16α,17α-cyclohexylidenedioxy derivative, 16α,17α-(3'-pentylidene)dioxy derivative, 16α,17α-ethylidenedioxy derivative, 16α,17α-phenylethylidenedioxy derivative, and 16α,17α-furfurylidenedioxy derivative, respectively, of 17α-hydroxy-16α-(hydroxymethyl)-6α-methylpregn-4-ene-3,20-dione.

Similarly, using the procedure described in Example 14 and reacting the appropriate 17α-hydroxy-16α-(hydroxymethyl)steroid (prepared as described in Example 13) with the appropriate aldehyde or ketone, there are obtained other 16α,17α-alkylidenedioxy compounds of the invention. Illustrative of such compounds are the 16α,17α-(2'-butylidene)dioxy derivatives, 16α,17α - (3'-pentylidene)dioxy derivatives, and 16α,17α-benzylidenedioxy derivatives of:

11β,17α-dihydroxy-16α-(hydroxymethyl)-9α-fluoro-6α-methyl-3,20-dioxopregna-1,4-diene,
11β,17α,21-trihydroxy-16α-(hydroxymethyl)-9α-fluoro-6α-methyl-3,20-dioxopregna-1,4-diene 21-acetate,
11β,17α,21-trihydroxy-16α-(hydroxymethyl)-6α,9α-difluoro-6α-methyl-3,20-dioxopregna-1,4-diene 21-acetate.
11β,17α,21-trihydroxy-16α-(hydroxymethyl)-6α,9α-difluoro-3,20-dioxopregna-1,4-diene 21-acetate,
17α-hydroxy-16α-(hydroxymethyl)-6α-fluoro-3,20-dioxopregna-1,4-diene,
17α-hydroxy-16α-(hydroxymethyl)-6α-fluoro-3,11,20-trioxopregn-4-ene, and
17α,21-dihydroxy-16α-(hydroxymethyl)-6α-fluoro-3,20-dioxopregna-1,4,9(11)-triene 21-acetate.

The above 21-acetates so obtained can be converted to the corresponding free 21-hydroxy compounds using the procedure described in Example 10 and the free 21-hydroxy compounds so obtained can be converted to other 21-acylates using the appropriate acid anhydride according to the procedure described in Example 12.

EXAMPLE 15

*17α,16α-(epoxymethylene)-6α-methylpregn-4-ene-3,20-dione*

A solution of 300 mg. of 17α-hydroxy-16α-(hydroxymethyl)-6α-methylpregn-4-ene-3,20-dione in 10 ml. of pyridene was allowed to stand for 18 hours at room temperature (approximately 25° C.) with 300 mg. of p-toluenesulfonyl chloride. The mixture so obtained was poured into a mixture of ice and water and the resulting suspension was extracted several times with methylene chloride. The methylene chloride extracts were washed successively with ice-cold dilute hydrochloric acid, aqueous sodium bicarbonate solution and water before being dried over anhydrous sodium sulfate. The dried solution was evaporated to dryness and the residue was triturated with ether. The solid which separated (0.34 g.; melting point 150 to 160° C.) was recrystallized from methanol. There was thus obtained 17α-hydroxy-16α-(p-tosyloxymethyl)-6α-methylpregn-4-ene - 3,20 - dione in the form of a crystalline solid having a melting point of 159 to 161° C., with decomposition. An analytical sample having a melting point of 165 to 167° C., with decomposition, was obtained by a second recrystallization from methanol.

*Analysis.*—Calcd. for $C_{30}H_{40}O_6S$: C, 68.19; H, 7.58. Found: C, 68.00; H, 7.65.

The infrared spectrum of the compound (mineral oil mull) exhibited maxima at 3550, 3070, 1733, 1665, 1610, 1599, 1490, 1340, 1235, 1165, 1185 and 807 reciprocal centimeters. The ultraviolet spectrum of the compound (ethanol solution) exhibited maxima at 227, 242 and 272 millimicrons.

To a solution of 0.839 g. of the tosylate (prepared as described above) in 40 ml. of t-butyl alcohol and 10 ml. of tetrahydrofuran at 10° C. was added with stirring under nitrogen a solution of 0.6 g. of potassium t-butoxide in 25 ml. of t-butyl alcohol. After the addition was complete, a further 25 ml. of tetrahydrofuran was added and the temperature of the mixture was allowed to rise to approximately 25° C. The mixture was maintained, with stirring, at this temperature for a short period before being treated with an excess of dilute hydrochloric acid. The resulting mixture was extracted several times with methylene chloride and the methylene chloride extracts were combined, washed with dilute aqueous sodium bicarbonate solution and then with water before being dried over anhydrous sodium sulfate. The dried solution was filtered and the filtrate was evaporated to dryness. The residue (0.751 g.) was dissolved in a small quantity of methylene chloride and chromatographed on a column of magnesium silicate (Florisil). The column was eluted with Skellysolve B containing increasing proportions of acetone and those fractions which, on the basis of infrared analysis, were found to contain the desired material, were combined and evaporated to dryness. The residue was recrystallized from ether and then from a mixture of acetone and Skellysolve B. There was thus obtained 17α,16α - (epoxymethylene)-6α-methylpregn-4-ene-3,20-dione in the form of a crystalline solid having a melting point of 135 to 138° C.

*Analysis.*—Calcd. for $C_{23}H_{32}O_3$: C, 77.49; H, 9.05. Found: C, 77.40; H, 9.09.

The infrared spectrum of the above compound (mineral oil mull) exhibited maxima at 1707, 1670, 1608, 1236, 1190 and 1049 reciprocal centimeters. The ultraviolet spectrum of the compound (ethanol solution) exhibited a maximum at 240 millimicrons ($\epsilon=16,250$).

Using the above procedure, but replacing the 17α-hydroxy-16α-(hydroxymethyl)-6α-methylpregn-4-ene - 3,20-dione employed as starting material by other 17α-hydroxy-16α-(hydroxymethyl) compounds of the invention, there are obtained the corresponding 17α,16α-(epoxymethylene) compounds. Representative of such compounds are:

17α,16α-(epoxymethylene)-11β-hydroxy-9α-fluoro-6α-methyl-3,20-dioxopregna-1,4-diene,
17α,16α-(epoxymethylene)-11β,21-dihydroxy-9α-fluoro-6α-methyl-3,20-dioxopregna-1,4-diene,
17α,16α-(epoxymethylene)-11β,21-dihydroxy-6α,9α-difluoro-3,20-dioxopregna-1,4-diene,
17α,16α-(epoxymethylene)-21-hydroxy-6α-fluoro-3,20-dioxopregna-4,9(11)-diene,
17α,16α-(epoxymethylene)-6α-fluoro-3,20-dioxopregna-1,4-diene, 17α,16α-(epoxymethylene)-6α-fluoro-3,11,20-trioxopregn-4-ene,
17α,16α-(epoxymethylene)-21-hydroxy-6α-fluoro-3,20-dioxopregna-1,4,9(11)-triene
17α,16α-(epoxymethylene)-3β,21-trihydroxy-20-oxopregn-5-ene
17α,16α-(epoxymethylene)-3β-hydroxy-6α-methyl-20-oxopregn-5-ene
17α,16α-(epoxymethylene)-3β-hydroxy-20-oxopregnane
17α,16α-(epoxymethylene)-3α-hydroxy-20-oxopregnane and,
17α,16α-(epoxymethylene)-3α,11β-dihydroxy-20-oxopregnane.

The above free 21-hydroxy compounds so obtained can be converted to other 21-acylates using the appropriate acid anhydride according to the procedure described in Example 12.

EXAMPLE 16
*16α-cyano-17α-hydroxy-6α-methylpregna-1,4-diene-3,20-dione*

A mixture of 6.0 g. of 16α-cyano-17α-hydroxy-6α-methylpregn-4-ene-3,20-dione and 6.0 g. of dichlorodicyanoquinone in 20 ml. of acetic acid and 20 ml. of dioxane is heated under reflux for 20 hours in an atmosphere of nitrogen. The resulting mixture is cooled and filtered to remove dichlorodicyanohydroquinone. The filtrate is diluted with methylene chloride and the organic layer is separated and washed successively with water, dilute aqueous sodium hydroxide solution and water (until neutral) before being dried over anhydrous sodium sulfate. The dried solution is evaporated to dryness and the residue is chromatographed on a column of magnesium silicate (Florisil). The column is eluted with Skellysolve B containing increasing proportions of acetone and those fractions which, on the basis of infrared analysis, are found to contain the desired material, are combined and evaporated to dryness. The residue is recrystallized from a mixture of acetone and Skellysolve B. There is thus obtained 16α-cyano-17α-hydroxy - 6α - methylpregna - 1,4 - diene-3,20-dione in the form of a crystalline solid.

Using the above procedure, but replacing the 16α-cyano-17α - hydroxy-6α-methylpregn-4-ene-3,20-dione employed as starting material by other Δ4-3-ketosteroids of the invention there are obtained the corresponding Δ1,4-3-ketosteroids of the invention. Illustrative of such compounds are:

17α,21-dihydroxy-16α-(hydroxymethyl)-6α-fluoro-3,20-dioxopregna-1,4,9(11)-triene 21-acetate,
17α-hydroxy-16α-(hydroxymethyl)-6α-fluoro-3,11,20-trioxopregna-1,4-diene,
17α,21-dihydroxy-16α-(hydroxymethyl)-6α-fluoro-3,20-dioxopregna-1,4,9(11)-triene 21-acetate, 16α,17α-acetonide,
17α-hydroxy-16α-(hydroxymethyl)-6α-fluoro-3,11,20-trioxopregna-1,4-diene 16α,17α-acetonide,
17α,16α-(epoxymethylene)-6α-methylpregna-1,4-diene-3,20-dione,
17α,16α-(epoxymethylene)-21-hydroxy-6α-fluoro-3,20-dioxopregna-1,4,9(11)-triene 21-acetate,
17α,16α-(epoxymethylene)-6α-fluoro-3,11,20-trioxopregna-1,4-diene,
17α,21-dihydroxy-16α-(2-hydroxyethyl)-6α-fluoro-3,20-dioxopregna-1,4,9(11)-triene-16b,17-cyclic ether 21-acetate,
17α-hydroxy-16α-(2-hydroxyethyl)-6α-fluoro-3,11,20-trioxopregna-1,4-diene-16b,17-cyclic ether, and
17α,21-dihydroxy-6α-fluoro-3,20-dioxopregna-1,4,9(11)-diene-16α-acetaldehyde-16b,17-cyclic enol ether, 21-acetate.

EXAMPLE 17
*16α-cyano-17α-hydroxy-6-methylpregna-4,6-diene-3,20-dione*

A mixture of 6.0 g. of 16α-cyano-17α-hydroxy-6α-methylpregn-4-ene-3,20-dione and 6.0 g. of chloranil in 200 ml. of t-amyl alcohol is heated under reflux for several hours before being cooled and filtered. The filtrate is evaporated to dryness under reduced pressure and the residue is dissolved in a small quantity of methylene chloride and chromatographed on a column of magnesium silicate (Florisil). The column is eluted with Skellysolve B containing increasing proportions of acetone and those fractions which, on the basis of infrared analysis, are found to contain the desired material, are combined and evaporated to dryness. The residue is recrystallized from a mixture of Skellysolve B and acetone. There is thus obtained 16α-cyano-17α-hydroxy-6-methylpregna-4,6-diene-3,20-dione in the form of a crystalline solid.

Using the above procedure, but replacing the 16α-cyano-17α-hydroxy - 6α - methylpregn - 4 - ene-3,20-dione employed as starting material by other 3-keto-Δ4- and 3-keto-Δ1,4-steroids of the invention there are obtained the corresponding 3-keto-Δ4,6- and 3-keto-Δ1,4,6-steroids of the invention. Representative of such compounds are:

17α-hydroxy-16α-(2-hydroxyethyl)-6-methyl-3,20-dioxopregna-4,6-diene-16b,17-cyclic ether,
11β,17α-dihydroxy-16α-(2-hydroxyethyl)-9α-fluoro-6-methyl-3,20-dioxopregna-1,4,6-triene-16b,17-cyclic ether,
17α,21-dihydroxy-16α-(2-hydroxyethyl)-6-fluoro-3,20-dioxopregna-4,6,9(11)-triene-16b,17-cyclic ether 21-acetate,
17α-hydroxy-16α-(2-hydroxyethyl)-6-fluoro-3,11,20-trioxopregna-4,6-diene-16b,17-cyclic ether,
17α-hydroxy-6-methyl-3,20-dioxopregna-4,6-diene-16α-acetaldehyde-16b,17-cyclic enol ether,
11β,17α-dihydroxy-9α-fluoro-6-methyl-3,20-dioxopregna-1,4,6-triene-16α-acetaldehyde 16b,17-cyclic enol ether,
11β,17α,21-trihydroxy-9α-fluoro-6-methyl-3,20-dioxopregna-1,4,6-triene-16α-acetaldehyde 16b,17-cyclic enol ether, 21-acetate,
11β,17α,21-trihydroxy-6,9α-difluoro-3,20-dioxopregna-1,4,6-triene-16α-acetaldehyde 16b,17-cyclic enol ether, 21-acetate,
17α,21-dihydroxy-6-fluoro-3,20-dioxopregna-4,6,9(11)-triene-16α-acetaldehyde 16b,17-cyclic enol ether, 21-acetate,
17α-hydroxy-6-fluoro-3,11,20-trioxopregna-4,6-diene-16α-acetaldehyde 16b,17-cyclic enol ether,
16α-cyano-11β,17α-dihydroxy-9α-fluoro-6-methyl-3,20-dioxopregna-1,4,6-triene,
16α-cyano-11β,17α,21-trihydroxy-9α-fluoro-6-methyl-3,20-dioxopregna-4,6-triene 21-acetate,
16α-cyano-11β,17α,21-trihydroxy-6,9α-difluoro-3,20-dioxopregna-1,4,6-triene 21-acetate,
16α-cyano-17α,21-dihydroxy-6-fluoro-3,20-dioxopregna-4,6,9(11)-triene 21-acetate,
16α-cyano-17α-hydroxy-6-fluoro-3,11,20-trioxopregna-4,6-diene,
16α-cyano-17α-hydroxy-6-fluoro-3,20-dioxopregna-1,4,6-triene,
16α-cyano-17α,21-dihydroxy-6-fluoro-3,20-dioxopregna-1,4,6,9(11)-tetraene 21-acetate,
17α-hydroxy-16α-(hydroxymethyl)-6-methylpregna-4,6-diene-3,20-dione,
11β,17α-dihydroxy-16α-(hydroxymethyl)-9α-fluoro-6-methyl-3,20-dioxopregna-1,4,6-triene,
11β,17α,21-trihydroxy-16α-(hydroxymethyl)-6,9α-difluoro-3,20-dioxopregna-1,4,6-triene 21-acetate,
17α,21-dihydroxy-16α-(hydroxymethyl)-6-fluoro-3,20-dioxopregna-4,6,9(11)-triene 21-acetate,
17α-hydroxy-16α-(hydroxymethyl)-6-methylpregna-4,6-diene-3,20-dione 16α,17α-acetonide,
11β,17α-dihydroxy-16α-(hydroxymethyl)-9α-fluoro-6-methyl-3,20-dioxopregna-1,4,6-triene 16α,17α-acetonide,
11β,17α,21-trihydroxy-16α-(hydroxymethyl)-6,9α-difluoro-3,20-dioxopregna-1,4,6-triene 21-acetate 16α,17α-acetonide, 17α,21-dihydroxy-16α-(hydroxymethyl)-6-fluoro-
3,20-dioxopregna-4,6,9(11)-triene 21-acetate
16α,17α-actonide, 16α,16α-(epoxymethylene)-6-methylpregna-4,6-
diene-3,20-dione, 17α,16α-(epoxymethylene)-9α-fluoro-6-methyl-
11β-hydroxy-3,20-dioxopregna-1,4,6-triene, 17α,16α-(epoxymethylene)-11β,21-dihydroxy-9α-
fluoro-6-methyl-3,20-dioxopregna-1,4,6-triene,
21-acetate, and 17α,16α-(epoxymethylene)-11β,21-dihydroxy-
6,9α-difluoro-3,20-dioxopregna-1,4,6-triene
21-acetate.

Where the 3-keto-Δ$^{2,6}$- and 3-keto-Δ$^{1,4,6}$-steroids so obtained have a 21-acyloxy group said group can be hydrolyzed according to the procedure described in Example 10, and the free 21-hydroxy compound so obtained can be converted to other 21-acylates using the appropriate acid anhydride according to the procedure described in Example 12.

EXAMPLE 18

*11β,17α-dihydroxy - 9α - fluoro - 6α - methyl-3,20-dioxopregna-1,4-diene-16α-acetaldehyde 16β,17-cyclic enol ether*

A. 17β - BROMO - 9α - FLUORO - 11β - HYDROXY - 6α-METHYL - 16α - (2 - OXOETHYL) - 17 - ISOPREGNA-1,4-DIENE-3,20-DIONE

To a solution of 4.57 g. of Δ$^{1,4}$-3-keto-9α-fluoro-11β-hydroxy-2′,6α-dimethyl - 6′β-methoxy-5′,6′-dihydroandrostano-[17,16α-c]-pyran in 40 ml. of tetrahydrofuran and 123 ml. of acetone was added with stirring at room temperature (ca. 25° C.) a solution of 4.68 g. of sodium acetate in 100 ml. of water. The mixture was stirred and maintained at 20° C. while 4.38 g. of N-bromosuccinimide was added. The resulting mixture was cooled rapidly to 5 to 10° C. and a solution of 3 ml. of acetic acid in 6 ml. of acetone was added dropwise with stirring over a period of 3 minutes. After the addition was complete, the mixture was maintained at 0° to 5° C. for 30 minutes with stirring. At the end of this time, a solution of 2.5 g. of sodium thiosulfate in 35 ml. of water was added and the mixture was stirred for a short period before adding methylene chloride and separating the organic layer. The organic layer was washed with saturated aqueous sodium bicarbonate solution containing sodium sulfite and the aqueous washings were re-extracted with methylene chloride. The combined methylene chloride extracts were washed with water, dried over anhydrous sodium sulfate, and evaporated to dryness. The residue (6.36 g.) was dissolved in 30 ml. of methylene chloride and chromatographed on a column of 500 g. of magnesium silicate (Florisil). The column was eluted with Skellysolve B containing increasing proportions of actone. Those fractions which, on the basis of infrared analysis, were found to contain the desired product were combined and evaporated to dryness. The residue was recrystallized from a mixture of acetone and Skellysolve B. There was thus obtained 3.55 g. of 17β-Bromo - 9α - fluoro - 11 β-hydroxy-6α-methyl-16α-(2-oxoethyl)-17-isopregna-1,4-diene-3,20-dione in the form of a crystalline solid having a melting point of 210 to 220° C. (with decomposition). An analystical sample having a melting point of 210 to 215° C. (with decomposition) was obtained by further recrystallization from a mixture of acetone and Skellysolve B.

*Analysis.*—Calcd. for $C_{24}H_{30}O_4BrF$: C, 59.88; H, 6.24; Br, 16.63. Found: C, 58.96; H, 6.98; Br, 16.28.

The ultraviolet spectrum of the compound (ethanol solution) exhibited a maximum at 238 millimicrons ($\epsilon$=15,550). The infrared spectrum of the compound (mineral oil mull) exhibited maxima at 3280, 2720, 1730, 1700, 1660, 1615, 1190, 1120, 1075 and 1020 reciprocal centimeters.

B. 11β,17α - DIHYDROXY - 9α - FLUORO - 6α - METHYL-PREGNA - 1,4 - DIENE - 3,20 - DIONE - 16α - ACETALDEHYDE 16b,17-CYCLIC ENOL ETHER

To a mixture of 200 ml. of dry dimethylformamide, 10 g. of anhydrous lithium bromide, and 6.0 g. of lithium carbonate was added 3.76 g. of 17β-bromo-9α-fluoro-11β-hydroxy-6α-methyl-16α-(2-oxoethyl) - 17 - isopregna-1,4-diene-3,20-dione. The resulting mixture was stirred and heated at 125 to 130° C. under an atmosphere of nitrogen for 18 hours. At the end of this time, the mixture was cooled and ethyl acetate was added. The diluted mixture was filtered and the filtrate was washed several times with water, dried over anhydrous sodium sulfate and evaporated to dryness. The residue was dissolved in 20 ml. of methylene chloride and chromatographed on a column of 500 g. of magnesium silicate (Florisil). The column was eluted with Skellysolve B containing increasing proportions of acetone and those fractions which, on the basis of infrared analysis, were found to contain the desired material, were combined and evaporated to dryness. The residue was recrystallized from a mixture of acetone and Skellysolve B. There was thus obtained 1.37 g. of 11β,17α-dihydroxy-9α-fluoro-6α-methylpregna-1,4-diene-3,20-dione-16α-acetaldehyde 16b,17-cyclic enol ether in the form of a crystalline solid having a melting point of 273 to 277° C. An analytical sample having a melting point of 287 to 289° C. was obtained by further recrystallization from a mixture of acetone and Skellysolve B.

*Analysis.*—Calcd. for $C_{24}H_{29}O_4F$: C, 72.0; H, 7.25; F, 4.75. Found: C, 71.98; H, 7.55; F, 4.58.

The ultraviolet spectrum of the compound (ethanol solution) exhibited a maximum at 239 millimicrons ($\epsilon$=15,600). The infrared spectrum of the compound (Mineral oil mull) exhibited maxima at 3300, 1715, 1665, 1615, 1250, 1170, 1150 and 1060 reciprocal centimeters.

I claim:

1. A compound selected from the class consisting of compounds having the formulae:

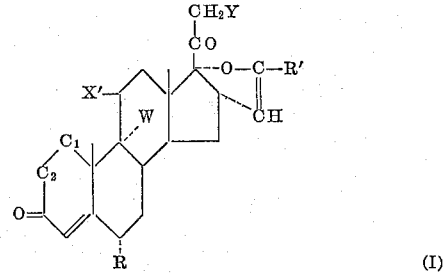

(I)

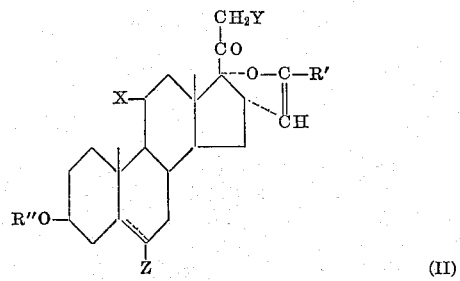

(II)

and

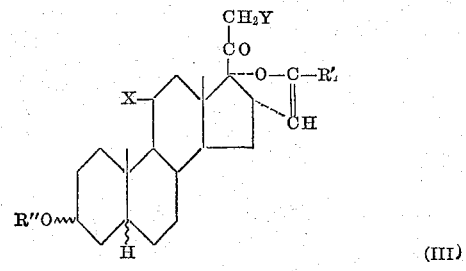

(III)

and the $\Delta^{6(7)}$ derivatives of the compounds of Formula I, wherein R is selected from the class consisting of hydrogen, fluorine, and methyl, R' is selected from the class consisting of hydrogen and lower-alkyl, R'' is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9,11-double bond, Y is selected from the class consisting of hydrogen, hydroxy, and acyloxy wherein acyl is as hereinbefore defined, Z is selected from the class consisting of hydrogen and methyl and —$C_1$—$C_2$— is a divalent radical selected from the class consisting of —$CH_2$—$CH_2$— and —CH=CH—.

2. A compound selected from the class consisting of compounds having the formula.

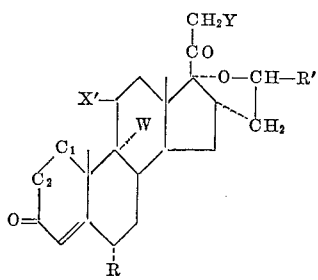

(IV)

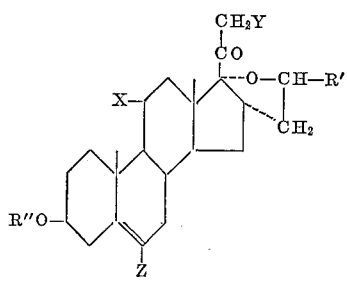

(V)

and

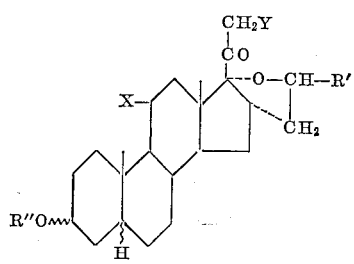

(VI)

and the $\Delta^{6(7)}$-derivatives of the compounds of Formula IV, wherein R is selected from the class consisting of hydrogen, fluorine, and methyl, R' is selected from the class consisting of hydrogen and lower alkyl, R'' is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9,11-double bond, Y is selected from the class consisting of hydrogen, hydroxy, and acyloxy wherein acyl is as hereinbefore defined, Z is selected from the class consisting of hydrogen and methyl, and —$C_1$—$C_2$— is a divalent radical selected from the class consisting of —$CH_2$—$CH_2$— and —CH=CH—.

3. A compound selected from the class consisting of compounds having the formula:

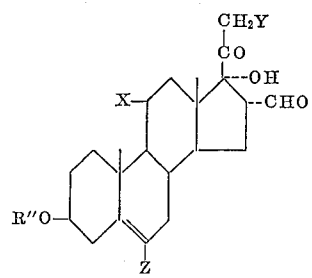

wherein Z is selected from the class consisting of hydrogen and methyl, R'' is selected from the class consisting of hydrogen and the acyl radical of a hydrocarbon carboxylic acid containing from 1 to 12 carbon atoms, inclusive, X is an 11-substituent selected from the class consisting of hydrogen, keto, α-hydroxy, β-hydroxy, and a 9,11-double bond, and Y is selected from the class consisting of hydrogen, and acyloxy wherein the acyl is as hereinbefore defined.

4. A compound selected from the class consisting of compounds having the formula:

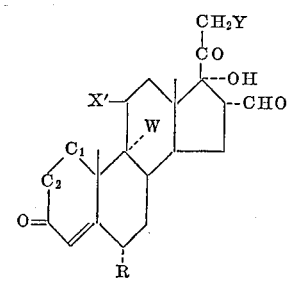

and the $\Delta^{6(7)}$-derivatives thereof, wherein R is fluorine, Y is selected from the class consisting of hydrogen and acyloxy wherein the acyl radical is that of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, and —$C_1$—$C_2$— is a divalent radical selected from the class consisting of —$CH_2$—$CH_2$— and —CH=CH—.

5. A compound selected from the class consisting of compounds having the formula:

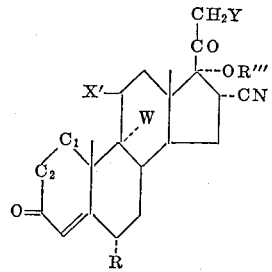

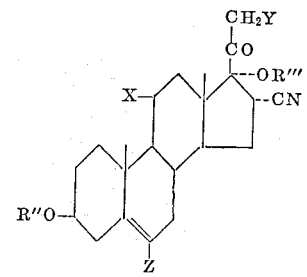

and

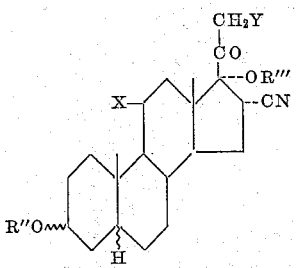

and the Δ⁶⁽⁷⁾-derivatives of the compounds of the first formula, wherein R is selected from the class consisting of hydrogen, fluorine, and methyl, R″ and R‴ are selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy and acyloxy wherein acyl is as hereinbefore defined, Z is selected from the class consisting of hydrogen and methyl, and —C₁—C₂— is a divalent radical selected from the class consisting of —CH₂—CH₂— and —CH=CH—.

6. A compound selected from the class consisting of compounds having the formula:

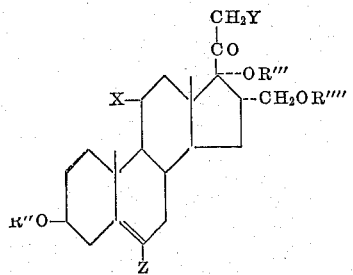

wherein Z is selected from the class consisting of hydrogen and methyl, R″, R‴ and R″″ are each selected from the class consisting of hydrogen and the acyl radical of a hydrocarbon carboxylic acid containing from 1 to 12 carbon atoms, inclusive, and R‴ and R″″ taken together with the attached oxygen atoms also represent

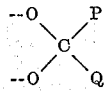

wherein P and Q are selected from the class consisting of hydrogen, lower alkyl, cycloalkyl having from 5 to 7 carbon atoms, inclusive, lower-aralkyl, and lower-aryl, X is an 11-substituent selected from the class consisting of hydrogen, keto, α-hydroxy, β-hydroxy and 9(11)-double bond, and Y is selected from the class consisting of hydrogen, hydroxy and acyloxy wherein acyl is as above defined.

7. A compound selected from the class consisting of compounds having the formula:

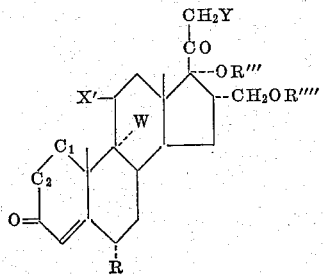

and the Δ⁶⁽⁷⁾-derivatives thereof, wherein R is fluorine R‴ and R″″ are each selected from the class consisting of hydrogen and the acyl radical of a hydrocarbon carboxylic acid containing from 1 to 12 atoms, inclusive, and R‴ and R″″ taken together with the attached oxygen atoms also represent

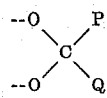

wherein P and Q are selected from the class consisting of hydrogen, lower-alkyl, cycloalkyl containing from 5 to 7 carbon atoms, inclusive, lower-aralkyl and lower-aryl, W is selected from the class consisting of hydrogen and fluorine, X' is an 11-substituent selected from the class consisting of hydrogen, keto, and α- and β-hydroxy, and X' and W taken together represent a 9(11)-double bond, Y is selected from the class consisting of hydrogen, hydroxy, and acyloxy wherein acyl is as above defined, and —C₁—C₂— is a divalent radical selected from the class consisting of —CH₂—CH₂— and —CH=CH—.

8. A compound selected from the class consisting of compounds having the formulae:

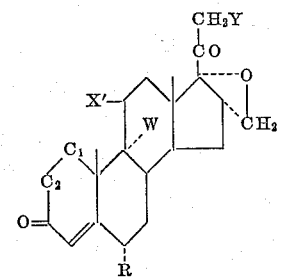

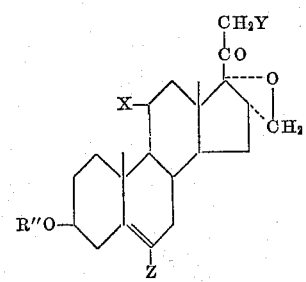

and

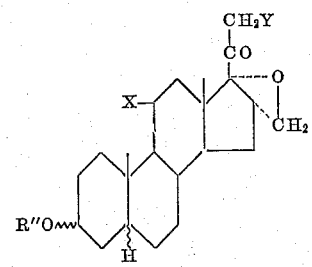

wherein R is selected from the class consisting of hydrogen, fluorine, and methyl, R″ is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as hereinbefore defined, Z is selected from the class consisting of hydrogen and methyl, and

—C₁—C₂— is a divalent radical selected from the class consisting of —CH₂—CH₂— and —CH=CH—.

9. 11β,17α - dihydroxy - 9α - fluoro - 6α - methyl - 3,20-dioxopregna-1,4-diene-16α-acetaldehyde 16b,17-cyclic enol ether.

10. 11β,17α,21 - trihydroxy - 6α,9α - difluoro - 3,20-dioxopregna-1,4-diene-16α-acetaldehyde 16b,17-cyclic enol ether, 21-acetate.

11. 17α - hydroxy - 6α - methyl - 3,20 - dioxopregn - 4-ene-16α-acetaldehyde 16b,17-cyclic enol ether.

12. 16α - formyl-17α - hydroxy - 6α - methylpregn - 4-ene-3,20-dione.

13. 16α - formyl-17α - hydroxy - 6α - methylpregn - 4-ene-3,20-dione 17α-formate.

14. 16α - cyano - 17α - hydroxy - 6α - methylpregn-4-ene-3,20-dione.

15. 16α - cyano - 17α - hydroxy - 6α - methylpregn - 4-ene-3,20-dione 17α-acetate.

16. 17α-hydroxy-16α-(hydroxymethyl)-6α-methylpregn-4-ene-3,20-dione.

17. 17α,16α - (epoxymethylene)-6α-methylpregn-4-ene-3,20-dione.

18. A process which comprises reacting a pregnane having in ring D the following configuration:

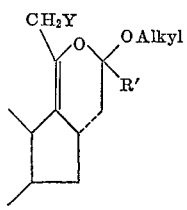

wherein Y is selected from the class consisting of hydrogen and acyloxy wherein the acyl radical is that of a hydrocarbon carboxylic acid containing from 1 to 12 carbon atoms, inclusive, and R′ is selected from the class consisting of hydrogen and lower-alkyl, with a halogenating agent selected from the class consisting of N-haloamides and N-haloimides wherein the halogen has an atomic weight from 35 to 127, in the presence of an acid selected from the class consisting of acetic, formic, perchloric and p-toluenesulfonic acids to obtain a 17β-halo-16α-(2-oxoalkyl)-isopregnane having in ring D the following configuration:

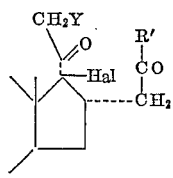

wherein Hal is a halogen atom having an atomic weight from 35 to 127 and Y and R′ have the significance above defined.

19. A process which comprises reacting a 17β-halo-16α-(2-oxoalkyl)-isopregnane having in ring D the following configuration:

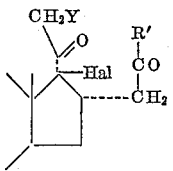

wherein Hal is a halogen atom having an atomic weight from 35 to 127, Y is selected from the group consisting of hydrogen and acyloxy wherein acyl is the radical of a hydrocarbon carboxylic acid containing from 1 to 12 carbon atoms, inclusive, and R′ is selected from the class consisting of hydrogen and lower-alkyl, with a dehydrohalogenating agent selected from the class consisting of anhydrous lithium salts, alkaline earth carbonates and tertiary organic amines in the presence of an organic solvent to obtain the corresponding 17α-hydroxy-16α-(oxoalkyl)-pregnane 16b,17-enol ether having in Ring D the following configuration:

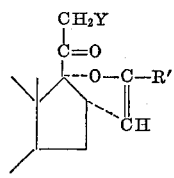

wherein Y and R′ have the significance above defined.

20. The process of claim 19 wherein the dehydrohalogenating agent is a mixture of anhydrous lithium bromide and lithium carbonate.

21. A process which comprises reacting a pregnane having in ring D the following configuration:

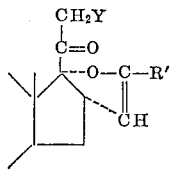

wherein Y is selected from the class consisting of hydrogen and acyloxy and R′ is selected from the class consisting of hydrogen and lower-alkyl, with a lower-alkyl mercaptan in the presence of a strong acid selected from the group consisting of acetic, formic, p-toluenesulfonic, sulfuric, hydrochloric, hydrobromic and perchloric acids to obtain the corresponding compound having in ring D the following configuration:

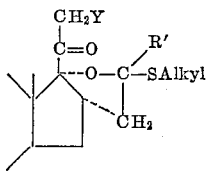

wherein R′ and Y have the significance above defined and subjecting the latter compound to desulfurization by treatment with Raney nickel to yield the corresponding compound having in ring D the following configuration:

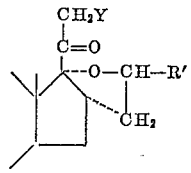

wherein Y and R′ have the significance above defined.

22. A process which comprises reacting a 17β-halo-16α-(2-oxoalkyl)-isopregnane having in ring D the following configuration:

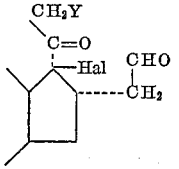

wherein Hal is a halogen atom having an atomic weight from 35 to 127, and Y is selected from the class consisting of hydrogen and acyloxy wherein the acyl is that of a hydrocarbon carboxylic acid containing from 1 to 12 carbon atoms, inclusive, with an oxidizing agent selected from the class consisting of sodium dichromate, potassium dichromate and chromic acid to produce the corresponding 17α-hydroxy-16α-acetic acid, reacting the latter with an esterifying agent selected from the class consisting of diazomethane and lower aliphatic alcohols to form the corresponding lower-alkyl ester and reacting the latter with a dehydrohalogenating agent selected from the class consisting of anhydrous lithium salts, alkaline earth carbonates and tertiary organic amines to produce the corresponding lactone having the following configuration in ring D:

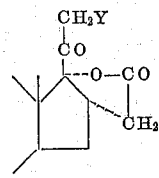

wherein Y has the significance above defined.

23. A process which comprises reacting a pregnane having in ring D the following configuration:

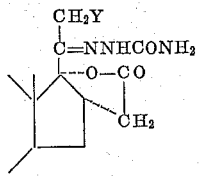

wherein Y is selected from the class consisting of hydrogen and acyloxy wherein the acyl radical is that of a hydrocarbon carboxylic acid containing from 1 to 12 carbon atoms, inclusive, with sodium borohydride in the presence of boron trifluoride to obtain the corresponding compound having in ring D the following configuration:

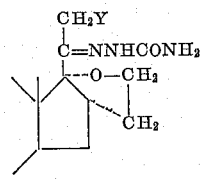

wherein Y has the significance above defined, and thereafter subjecting the latter compound to acid hydrolysis to liberate the corresponding 20-keto compound.

24. A process which comprises reacting a pregnane having in ring D the following configuration:

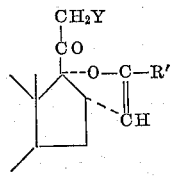

wherein R' is selected from the class consisting of hydrogen and lower-alkyl and Y is selected from the class consisting of hydrogen and acyloxy wherein acyl is the residue of a hydrocarbon carboxylic acid containing from 1 to 12 carbon atoms, inclusive, with osmium tetroxide in the presence of an inert organic solvent to obtain the corresponding glycol having in ring D the following configuration:

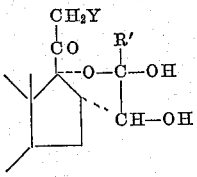

wherein Y and R' have the significance above defined, and reacting the latter glycol with an oxidizing agent selected from the class consisting of lead tetraacetate and sodium periodate to obtain the corresponding 17α-hydroxy-16α-aldehydo compound having in ring D the following configuration:

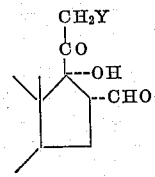

wherein Y has the significance above defined.

25. A process which comprises reacting a pregnane having in ring D the following configuration:

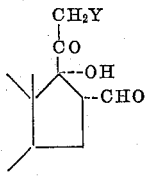

wherein Y is selected from the class consisting of hydrogen and acyloxy wherein the acyl radical is that of a hydrocarbon carboxylic acid containing from 1 to 12 carbon atoms, inclusive, with O,N-bis(trifluoroacetyl)hydroxylamine in the presence of a tertiary organic base to obtain the corresponding 16α-cyano compound having the following configuration in ring D:

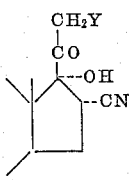

wherein Y has the significance above defined.

26. A process which comprises reacting a compound having in ring D the following configuration:

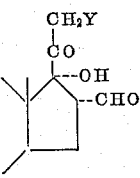

wherein Y is selected from the class consisting of hydrogen and acyloxy wherein acyl is the radical of a hydrocarbon carboxylic acid containing from 1 to 12 carbon atoms, inclusive, with an alkali metal borohydride in the presence of an organic solvent to obtain the corresponding 16α-(hydroxymethyl) compound having in ring D the following configuration:

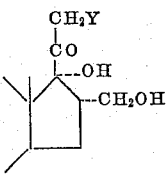

wherein Y has the significance above defined.

27. A process which comprises reacting a compound having in ring D the following configuration:

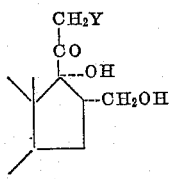

wherein Y is selected from the class consisting of hydrogen and acyloxy wherein the acyl radical is that of a hydrocarbon carboxylic acid containing from 1 to 12 carbon atoms, inclusive, with a carbonylic compound

wherein P and Q are selected from the class consisting of hydrogen, lower-alkyl, cycloalkyl containing from 5 to 7 carbon atoms, inclusive, lower-aralkyl, and lower-aryl, to obtain the corresponding compound having in ring D the configuration:

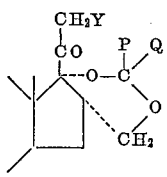

wherein Y, P and Q have the significance above defined.

28. A process which comprises reacting a pregnane having in ring D the configuration:

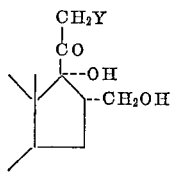

wherein Y is selected from the class consisting of hydrogen and acyloxy wherein the acyl radical is that of a hydrocarbon carboxylic acid containing from 1 to 12 carbon atoms, inclusive, with a hydrocarbonsulfonyl halide selected from the class consisting of alkylsulfonyl halides and arylsulfonyl halides in the presence of a tertiary organic base to obtain the corresponding 16α-(hydrocarbonsulfonyloxymethyl) compound and reacting the latter compound with an alkali metal alkoxide in the presence of a lower alkanol to obtain the corresponding compound having in ring D the following configuration:

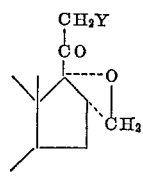

wherein Y has the significance above defined.

29. A compound selected from the class consisting of compounds having the formulae:

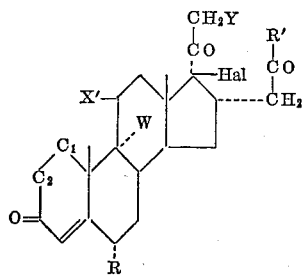

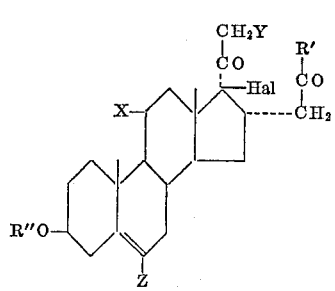

and

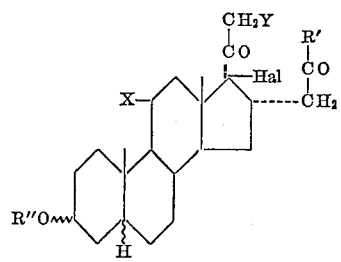

wherein R is selected from the class consisting of hydrogen, fluorine, and methyl, R' is selected from the class consisting of hydrogen and lower-alkyl, R" is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as above defined, Z is selected from the class consisting of hydrogen and methyl, —$C_1$—$C_2$— is a divalent radical selected from the class consisting of —$CH_2$—$CH_2$— and —CH=CH—, and Hal is a halogen atom having an atomic weight from 35 to 127.

30. A compound having the formula:

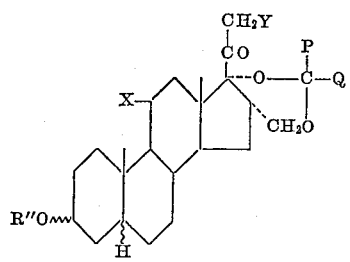

wherein R" is selected from the class consisting of hydrogen and the acyl radical of a hydrocarbon carboxylic acid containing from 1 to 12 carbon atoms, inclusive, P and Q are selected from the class consisting of hydrogen, lower-alkyl, cycloalkyl having from 5 to 7 carbon atoms, inclusive, lower-aralkyl, and lower-aryl, X is an 11-substituent selected from the class consisting of hydrogen, keto, α-hydroxy, β-hydroxy and a 9(11)-double bond, and Y is selected from the class consisting of hydrogen, hydroxy, and acyloxy wherein acyl is as above defined.

31. A compound selected from the class consisting of compounds having the formula:

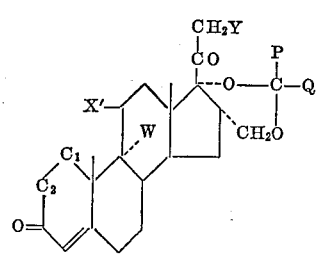

and the $\Delta^{6,7}$-derivatives thereof wherein P and Q are selected from the class consisting of hydrogen, lower-alkyl, cycloalkyl containing from 5 to 7 carbon atoms, inclusive, lower-aralkyl and lower-aryl, W is selected from the class consisting of hydrogen and fluorine, X' is an 11-substituent selected from the class consisting of hydrogen, keto, and α- and β-hydroxy, and X' and W taken together represent a 9(11)-double bond, Y is selected from the class consisting of hydrogen, hydroxy, and acyloxy wherein acyl is as above defined, and —$C_1$—$C_2$— is a divalent radical selected from the class consisting of —$CH_2$—$CH_2$— and —CH=CH—.

32. 11β,17α,21-trihydroxy-9α-fluoro-6α-methyl-3,20-dioxopregna-1,4-diene-16α-acetaldehyde 16b,17-cyclic enol ether 21-acetate.

References Cited by the Examiner

UNITED STATES PATENTS 2,840,576 6/58 Marshall et al. _____ 260—397.3
2,889,342 6/59 Loken _____ 260—397.4
3,068,224 12/62 Taub et al. _____ 260—349.55

OTHER REFERENCES

Agnello et al. "J. Am. Chem. Soc." (1960), volume 82, page 4293.

LEWIS GOTTS, *Primary Examiner*.

UNITED STATES PATENT OFFICE
CERTIFICATE OF CORRECTION

Patent No. 3,201,392                                                  August 17, 1966

John E. Pike

It is hereby certified that error appears in the above numbered patent requiring correction and that the said Letters Patent should read as corrected below.

Column 3, line 47, for "5′,6-" read -- 5′,6′- --; column 11, line 14, strike out "in"; column 13, line 21, for "5′,6-" read -- 5′,6′- --; column 14, line 41, for "9α-fluoro-5α-" read -- 9α-fluoro-6α- --; column 17, line 17, for "(2-oxotheyl)" read -- (2-oxoethyl) --; line 23, for "-isopregnene-" read -- -isopregn- --; column 19, line 42, for "-triooxopregn-" read -- -trioxopregn- --; column 20, line 63, beginning with "A. 17α-" strike out all to and including "ETHER" in line 65, same column 20; column 23, line 63, for "4-ene-" read -- 5-ene- --; column 25, line 21, for "6α-difluoro-" read -- 6α,9α-difluoro- --; line 23, for "17α-hydroxy" read -- 17α,21-dihydroxy --; column 27, line 12, for "17α,11β-" read -- 17α,3α,11β- --; column 28, line 60, for "6-fluoro" read -- 6α-fluoro --; line 61, for "1,4,9(11)-triene" read -- 4,9(11)-diene --; line 66, for "21-hydroxy" read -- 21-dihydroxy --; column 29, lines 50 and 51, for "11β,17α,21-trihydroxy-6α-(hydroxymethyl)-6α,9α-diflu-6α-methyl-3,20-dioxopregna-1,4-diene 21-acetate." read -- 11β,17α,21-trihydroxy-16α-(hydroxymethyl)-6α,9α-difluoro-3,20-dioxopregna-1,4-diene 21-acetate, --; line 52, for "11β,17α,21-trihydroxy-16α-(hydroxymethyl)-6α,9α-difluoro-3,20-dioxopregna-1,4-diene 21-acetate," read -- 17α,21-dihydroxy-16α-(hydroxymethyl)-6α-fluoro-3,20-dioxopregna-4,9(11)-diene 21-acetate, --; column 32, line 48, for "4,6-triene" read -- 1,4,6-triene --; column 33, line 4, for "16α,16α" read -- 17α,16α --; line 14, for "$\Delta^{2,6}$" read -- $\Delta^{4,6}$ --; column 35 line 20, for "formula." read -- formulae: --; column 36, line 51, for "formula:" read -- formulae: --.

Signed and sealed this 7th day of February 1967.

(SEAL)
Attest:

ERNEST W. SWIDER                                   EDWARD J. BRENNER
Attesting Officer                                       Commissioner of Patents